(12) United States Patent
Yamazaki et al.

(10) Patent No.: US 10,199,694 B2
(45) Date of Patent: *Feb. 5, 2019

(54) POWER STORAGE SYSTEM

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Masaaki Hiroki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 191 days.

This patent is subject to a terminal disclaimer.

(21) Appl. No.: 15/259,135

(22) Filed: Sep. 8, 2016

(65) Prior Publication Data

US 2017/0098866 A1 Apr. 6, 2017

Related U.S. Application Data

(63) Continuation of application No. 14/190,123, filed on Feb. 26, 2014, now Pat. No. 9,444,256.

(30) Foreign Application Priority Data

Mar. 1, 2013 (JP) ................................ 2013-040595

(51) Int. Cl.
*H02J 3/32* (2006.01)
*H01M 10/42* (2006.01)
(Continued)

(52) U.S. Cl.
CPC ....... *H01M 10/425* (2013.01); *H01M 2/1077* (2013.01); *H01M 4/587* (2013.01);
(Continued)

(58) Field of Classification Search
CPC .... H02J 3/32; H02J 7/041; H02J 7/045; H02J 13/0006; H01M 10/42; H01M 10/44;
(Continued)

(56) References Cited

U.S. PATENT DOCUMENTS 5,177,425 A 1/1993 Goto
7,714,535 B2 5/2010 Yamazaki et al.
(Continued)

FOREIGN PATENT DOCUMENTS

CN 202126599 1/2012
EP 0348983 A 1/1990
(Continued)

OTHER PUBLICATIONS

Taiwanese Office Action (Application No. 103106493) dated Jul. 18, 2017.

*Primary Examiner* — Robert Deberadinis
(74) *Attorney, Agent, or Firm* — Nixon Peabody LLP; Jeffrey L. Costellia

(57) ABSTRACT

A power storage system includes an AC/DC converter, a first control device, a power storage device, and a load. The first control device includes a measuring portion that measures the amount of power consumed by the load, a predicting portion that predicts the demand for power consumed by the load on the basis of the amount of power consumed by the load, and a planning portion that makes a charge and discharge plan of the power storage device on the basis of the demand for power predicted by the predicting portion. The power storage device includes a second control device, a DC/DC converter, a first battery cell group, and a second battery cell group. The power storage device is placed in an underfloor space surrounded by a base and a floor of a building.

15 Claims, 16 Drawing Sheets

(51) Int. Cl.
*H01M 10/44* (2006.01)
*H01M 2/10* (2006.01)
*H01M 4/58* (2010.01)
*H01M 4/587* (2010.01)
*H01M 10/0525* (2010.01)
*H02J 13/00* (2006.01)
*H02M 3/04* (2006.01)
*H02M 7/04* (2006.01)
*H02J 7/04* (2006.01)

(52) U.S. Cl.
CPC ..... *H01M 4/5825* (2013.01); *H01M 10/0525* (2013.01); *H01M 10/42* (2013.01); *H01M 10/44* (2013.01); *H02J 3/32* (2013.01); *H02J 13/0006* (2013.01); *H02M 3/04* (2013.01); *H02M 7/04* (2013.01); *H01M 2010/4271* (2013.01); *H01M 2220/10* (2013.01); *H02J 7/041* (2013.01); *H02J 7/045* (2013.01); *Y10T 307/344* (2015.04)

(58) Field of Classification Search
CPC .. H01M 2220/10; H01M 7/041; H01M 7/045; H01M 10/425; H01M 2/1077; H01M 4/5825; H01M 4/587; H01M 10/0525; H01M 2010/4271; Y10T 307/344; H02M 3/04; H02M 7/04
See application file for complete search history.

(56) References Cited

U.S. PATENT DOCUMENTS

| | | | |
|---|---|---|---|
| 7,852,044 B2 | 12/2010 | Yamazaki et al. | |
| 8,054,035 B2 | 11/2011 | Yamazaki et al. | |
| 8,203,309 B2 | 6/2012 | Maegawa | |
| 8,597,830 B2 | 12/2013 | Kawakami et al. | |
| 8,692,249 B2 | 4/2014 | Yamazaki et al. | |
| 9,070,563 B2 | 6/2015 | Yamazaki et al. | |
| 9,444,256 B2 * | 9/2016 | Yamazaki | H02J 3/32 |
| 9,597,975 B2 | 3/2017 | Ito et al. | |
| 2010/0188048 A1 | 7/2010 | Nishino et al. | |
| 2011/0294009 A1 | 12/2011 | Kawakami et al. | |
| 2012/0074894 A1 | 3/2012 | Chen et al. | |
| 2014/0197797 A1 | 7/2014 | Yamazaki | |
| 2014/0197802 A1 | 7/2014 | Yamazaki | |
| 2014/0199580 A1 | 7/2014 | Yamazaki | |

FOREIGN PATENT DOCUMENTS

| | | |
|---|---|---|
| EP | 2202865 A | 6/2010 |
| EP | 2434609 A | 3/2012 |
| JP | 02-015580 A | 1/1990 |
| JP | 05-152002 A | 6/1993 |
| JP | 2000-323113 A | 11/2000 |
| JP | 2007-141516 A | 6/2007 |
| JP | 2009-106007 A | 5/2009 |
| JP | 2009-181907 A | 8/2009 |
| JP | 2010-060406 A | 3/2010 |
| JP | 2010-163744 A | 7/2010 |
| JP | 2011-126431 A | 6/2011 |
| JP | 2011-150976 A | 8/2011 |
| JP | 2011-216200 | 10/2011 |
| JP | 2011-216200 A | 10/2011 |
| JP | 2012-009418 A | 1/2012 |
| JP | 2012-023948 A | 2/2012 |
| JP | 2012-065516 A | 3/2012 |
| JP | 2012-070609 A | 4/2012 |
| JP | 2012-084486 A | 4/2012 |
| JP | 5057156 | 10/2012 |
| JP | 2013-027214 A | 2/2013 |
| TW | 366622 | 8/1999 |
| TW | 200826335 | 6/2008 |
| TW | 201230472 | 7/2012 |

* cited by examiner

Overall reaction : LiFePO$_4$ + C$_6$ → FePO$_4$ + LiC$_6$

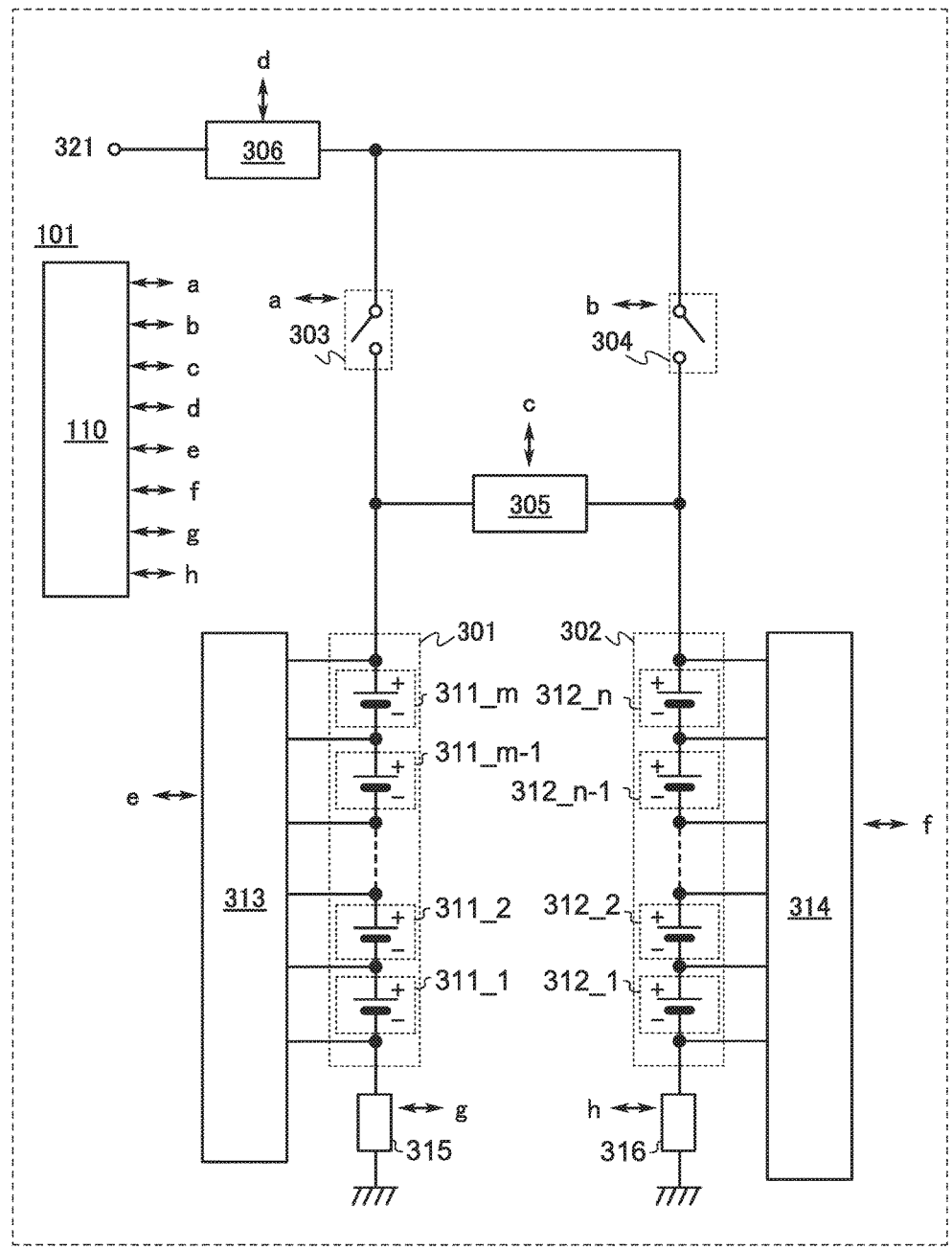

POWER STORAGE SYSTEM

BACKGROUND OF THE INVENTION

1. Field of the Invention

The present invention relates to a secondary battery and a power storage system using a secondary battery. The present invention relates to a system having a function of recovering a secondary battery from its deteriorated state.

2. Description of the Related Art

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for electrical devices, for example, portable information terminals such as mobile phones, smartphones, and laptop computers, portable music players, and digital cameras. The lithium-ion secondary batteries are essential as rechargeable energy supply sources for today's information society.

If power supply equipment malfunctions or is partly broken or an electric power company stops or reduces power supply because of natural disasters (e.g., crustal alteration such as earthquakes and ground subsidence, typhoons, and lighting strikes), terrorism, accidents, or the like, for example, not only social life but also personal lives can be significantly influenced. Thus, demand of home-use power storage devices that can provide electric energy by individuals has been increasing.

A lithium-ion secondary battery includes at least a positive electrode, a negative electrode, and an electrolytic solution (Patent Document 1).

REFERENCE

[Patent Document 1] Japanese Published Patent Application No. 2012-009418

SUMMARY OF THE INVENTION

It is preferable that home-use power storage devices have high capacity and a long lifetime. However, increasing the capacity of the power storage devices increases the volume thereof. Further, increasing the lifetime of the power storage devices decreases the volumetric efficiency, leading to an increase in the volume. When the volume of the power storage devices is increased, it is difficult to provide the power storage device indoors; thus, the power storage device needs to be provided outdoors.

However, in the case where the power storage device is provided outdoors, it is exposed to rain or the like and thus deteriorates by moisture. Further, in the case where the power storage device is provided outdoors, when the outside air is at a low temperature (e.g., in a minus temperature range), the power storage device significantly deteriorates, reducing the lifetime of the power storage device. Inhibiting deterioration of the power storage device requires regular maintenance of the power storage device; thus, in addition to the cost for purchasing the power storage device, the maintenance cost and the like are further needed. Consequently, burdens of the cost of a power storage device are large for an individual.

In the case where an individual possesses a home-use power storage device and installs it outside his/her residence (building), the power storage device is provided in an area of a site that can be used by the individual. When the ratio of the building area to the site area, that is, building-to-land ratio, is high and the power storage device is provided in a space limited by an adjacent house or a wall, the size of the power storage device is necessarily considered. Even in the case where there is an enough outside space for installation of a large power storage device, it may be difficult to secure a carrying path for installation. Note that the term "outside a house" mean an area other than the building area when seen from above.

In view of the above problems, an object of one embodiment of the present invention is to provide a power storage device with high capacity. Another object of one embodiment of the present invention is to provide a power storage device with a long lifetime. Another object of one embodiment of the present invention is to provide a power storage device with high reliability.

Further, another object of one embodiment of the present invention is to provide a small-sized power storage device with high capacity that can be provided indoors.

One embodiment of the present invention is a power storage system including an AC/DC converter, a first control device, a power storage device, and a load. The first control device includes a measuring portion that measures the amount of power consumed by the load, a predicting portion that predicts the demand for power consumed by the load on the basis of the amount of power consumed by the load, and a planning portion that makes a charge and discharge plan of the power storage device on the basis of the demand for power predicted by the predicting portion. The power storage device includes a second control device, a DC/DC converter, a first battery cell group, and a second battery cell group. One terminal of the DC/DC converter is electrically connected to one terminal of the AC/DC converter and one terminal of the first battery cell group. The other terminal of the DC/DC converter is electrically connected to the one terminal of the AC/DC converter and one terminal of the second battery cell group. The power storage device is placed in an underfloor space surrounded by a base and a floor of a building.

According to one embodiment of the present invention, a power storage device with high capacity can be provided. A small-sized power storage device with high capacity that can be provided indoors can be provided. A power storage device with a long lifetime can be provided. The reliability of a power storage device can be improved. A power storage system using the power storage device can be provided.

When power storage devices of one embodiment of the present invention are widely used, as the number of houses that install the power storage devices of one embodiment of the present invention indoors increases, burdens of a power plant in a region where the houses are located are reduced, which can contribute to an effective use and a stable supply of power. Further, according to one embodiment of the present invention, the power storage device is charged in the night time when the use amount of power is small, and is used in the day time when the use amount of power is large; thus, power can be efficiently stored and used. Further, since the power storage device 101 is used in the day time when the usage charge of a commercial power source is high, the electricity charge is low and an economic merit can be obtained.

BRIEF DESCRIPTION OF THE DRAWINGS

In the accompanying drawings:

FIG. 10 is a circuit diagram of a power storage device;

DETAILED DESCRIPTION OF THE INVENTION

Embodiments and an example of the present invention will be described below in detail with reference to the drawings. However, the present invention is not limited to the description below, and it is easily understood by those skilled in the art that modes and details disclosed herein can be modified in various ways. The present invention is not construed as being limited to descriptions of the embodiments and the example.

Embodiment 1

In this embodiment, a power storage device of one embodiment of the present invention will be described with reference to FIGS. 1A and 1B.

Figure 1A:
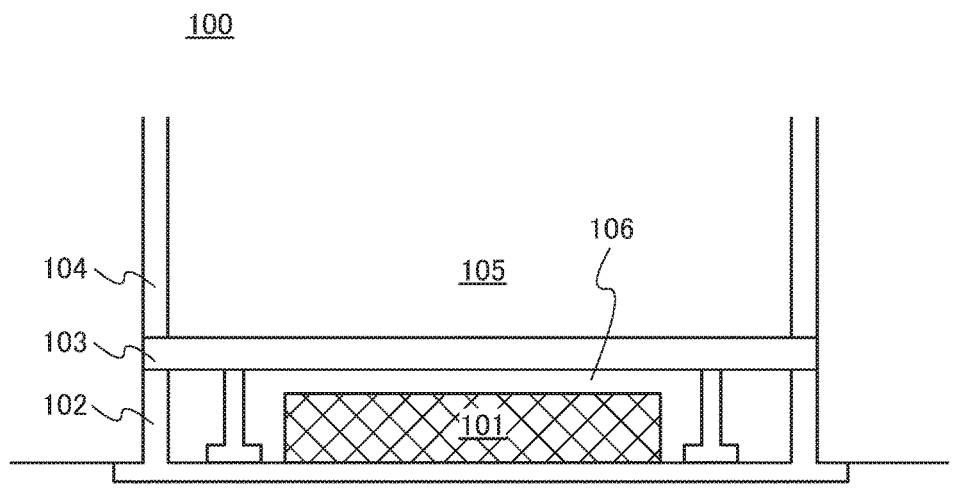
FIGS. 1A and 1B each illustrate a power storage device placed in an underfloor space of a building.

A building 100 illustrated in FIG. 1A includes a base 102, a floor 103, an exterior wall 104, a space 105, and an underfloor space 106. A power storage device 101 (also referred to as an electronic device) of one embodiment of the present invention is placed in the underfloor space 106, which is surrounded by the base 102 and the floor 103 of the building 100.

Figure 1B:
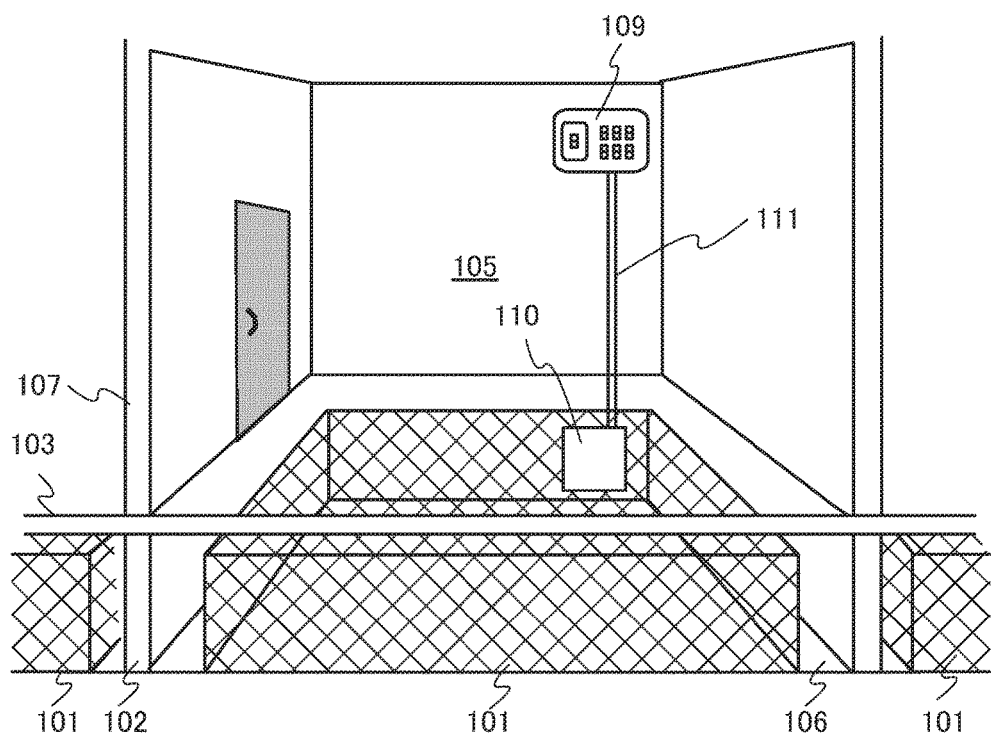

As illustrated in FIG. 1B, the underfloor space 106 is partitioned by the bases 102 in the building 100. The inside of the building 100 is partitioned by an interior wall 107. The power storage device 101 is placed in the underfloor space 106. In the case where there are a plurality of underfloor spaces 106 partitioned by the bases 102, the power storage device 101 can be placed in each of the underfloor spaces 106.

The power storage device 101 of one embodiment of the present invention includes a plurality of secondary batteries (hereinafter also referred to as battery cells).

A battery cell of one embodiment of the present invention prevents deposition and growth of a reaction product on a surface of an electrode, which might cause deterioration or a variety of abnormal situations. Even if a reaction product is deposited, the reaction product can be dissolved by applying a signal to supply a current in the reverse direction of a current with which a reaction product is formed. Further, the growth of a reaction product can be inhibited by applying a signal to supply a current in the reverse direction of the current with which a reaction product is formed before formation of a reaction product. This can inhibit deterioration of the electrode of a battery cell.

The signal with which a reverse current flows refers to a pulse current, and can also be referred to as an inversion pulse current. Note that an inversion pulse current refers to a current of a signal with which a current does not flow successively or continuously but flows momentarily or continuously only for a moment (for 0.1 seconds to 3 minutes inclusive, typically 3 seconds to 30 seconds inclusive). Intervals at which an inversion pulse current is supplied and the intensity of the inversion pulse current are set as appropriate.

The use of a plurality of such battery cells in the power storage device 101 can increase the reliability of the power storage device 101. This can increase the lifetime of the power storage device 101, so that regular maintenance of the power storage device 101 is not required or the frequency of maintenance can be reduced. When regular maintenance of the power storage device 101 of one embodiment of the present invention is not required, a workspace for maintenance around the power storage device 101 is unnecessary. Accordingly, the power storage device 101 can be provided indoors. Note that in this specification and the like, the term "provided indoors" means being provided in the area of a building (except a rooftop) when seen from above, and being provided in an underfloor space or a basement of the building is covered by the term.

Further, repeatedly supplying an inversion pulse current while the battery cell is charged can prevent heat generation or ignition of the battery cell due to a short circuit caused by a reaction product deposited on a surface of an electrode of the battery cell. In other words, since the safety of the power storage device 101 including the battery cell can be improved, the power storage device 101 can be placed (or provided) in the underfloor space 106.

In order to ensure the safety of the power storage device 101 more reliably, an exterior of the power storage device 101 preferably has measures against water and fire. Further, the base 102 and the floor 103 preferably have measures against water and fire.

For example, lithium metal deposited on a negative electrode of a battery cell causes a variety of defects in the battery cell, which might decrease the reliability of the battery cell. In order to prevent this, the capacity of a negative electrode is made high with respect to the capacity of a positive electrode (the capacity ratio is set to be low) in some cases. The capacity ratio means the proportion of the volume capacity of a positive electrode to the volume capacity of a negative electrode, and when the capacity ratio can be high, the whole volume capacity (the total of the volume capacity of the positive electrode and the volume capacity of the negative electrode) with respect to a certain capacity value can be low.

Even if lithium metal is deposited on a negative electrode, it can be dissolved by supplying an inversion pulse current while a battery cell is charged; thus, the reliability of the battery cell can be increased. Consequently, the capacity ratio of the battery cell can be increased, so that the size of the battery cell can be reduced.

Thus, the significantly downsized power storage device 101 that uses such downsized battery cells can be installed indoors; specifically, the power storage device 101 can be placed in the underfloor space 106. Further, the power storage device 101 using such downsized battery cells can have a longer lifetime; thus, replacement of the power storage device 101 is unnecessary. Further, the size of the power storage device 101 may be increased to a size such that it can be placed in the underfloor space 106.

The use of a plurality of battery cells of one embodiment of the present invention precludes an increase in the volume of the power storage device 101 as large as an increase in that of a conventional one; thus, the power storage device 101 does not need to be provided outdoors and can be placed in the underfloor space 106. When being placed in the underfloor space 106 as described above, the power storage device 101 can be prevented from being exposed to rain or the like, inhibiting deterioration of the power storage device 101 due to moisture. Further, even when the outside air is at a low temperature (e.g., in a minus temperature range), deterioration of the power storage device 101 can be inhibited because the power storage device 101 is provided indoors. This can further increase the lifetime of the power storage device 101.

The lifetime of a building such as an individual house is approximately 30 years after construction. The power storage device 101 of one embodiment of the present invention is placed in the underfloor space 106 and is preferably kept placed in the underfloor space 106 for 30 years, more preferably, for 50 years, without maintenance.

The power storage device 101 can be provided in the underfloor space 106 when or after the building 100 is built. The underfloor space 106 of the building 100 can be effectively used.

In the case where a conventional power storage device is provided outdoors, a wide area for providing the power storage device is needed. Further, when the power storage device is provided, it is necessary to secure a workspace for maintenance around the power storage device.

When the power storage device 101 of one embodiment of the present invention is provided in the underfloor space 106, a wide area for providing the power storage device 101 outdoors is unnecessary. Further, when the power storage device 101 is provided in the underfloor space 106, it is not necessary to secure a workspace for maintenance around the power storage device 101.

The amount of power that can be stored in the power storage device 101 of one embodiment of the present invention is greater than or equal to 10 kWh and less than or equal to 40 kWh. In the case where the amount of power that can be stored in the power storage device 101 is 40 kWh, for example, 400 battery cells with 100 Wh at 3.2 V are used. Since the size of the battery cell can be reduced as described above, an increase in the volume of the power storage device 101 can be prevented even when the number of battery cells needed for the power storage device 101 is increased to more than 400. It is preferable that, for example, a graphite electrode and lithium iron phosphate ($LiFePO_4$) be used for a negative electrode and a positive electrode of the battery cell, respectively. In that case, the safety of the battery cell and the safety of the power storage device 101 including the battery cell can be increased.

For example, the power storage device of one embodiment of the present invention is charged using an AC/DC converter in the night time and discharged using a DC/AC converter (e.g., 50 Hz or 60 Hz) in the day time. The power storage device 101 is charged in the night time when the use amount of power is small, and is used indoors in the day time when the use amount of power is large; thus, power can be efficiently stored and used. Further, since the power storage device 101 is used in the day time when the usage charge of a commercial power source is high, the electricity charge is low and an economic merit can be obtained. Note that the frequency and voltage at the time of using power stored in the power storage device 101 can be set as appropriate depending on a region (country) where the power storage device 101 is used.

As illustrated in FIG. 1B, the power storage device 101 is provided with a control device 110, and the control device 110 is electrically connected to a distribution board 109 through a wiring 111.

The control device 110 has a function of controlling charge and discharge of each battery cell, a function of protecting the battery cells from overcurrent and overvoltage, a function of controlling temperature, a function of controlling a battery balance between the battery cells, a function of outputting power to the distribution board 109, and the like.

A plurality of power storage devices 101 provided in the underfloor spaces 106 under rooms each may include the control device 110, and each of the control devices 110 may be electrically connected to the distribution board 109 through the wiring 111.

In the power storage device 101 illustrated in FIGS. 1A and 1B, a plurality of battery cells which operate according to the mechanisms described above are connected in series. Further, parallely connecting units each including the plurality of battery cells (one unit is also referred to as a battery cell group) connected in series can increase the capacity of the power storage device 101. Even when having high capacity and large volume, the power storage device 101 can be placed in an underfloor space surrounded by a base and a floor of a building as illustrated in FIGS. 1A and 1B. Since the power storage device 101 can be placed in the underfloor space 106, the power storage device 101 does not need to be provided outdoors. When being placed in the underfloor space 106 as described above, the power storage device 101 can be prevented from being exposed to rain or the like, inhibiting deterioration of the power storage device 101 due to moisture. Further, even when the outside air is at a low temperature (e.g., in a minus temperature range), deterioration of the power storage device 101 can be inhibited because the power storage device 101 is provided indoors. This can further increase the lifetime of the power storage device 101.

This embodiment can be freely combined with any of the other embodiments.

Embodiment 2

In this embodiment, the operation principle of a lithium-ion secondary battery will be described and then a mechanism of product formation on an electrode surface of a battery cell and a mechanism of product dissolution will be described.

First, the operation principle of the lithium-ion secondary battery will be described with reference to FIGS. 2A and 2B, FIGS. 3A and 3B, and FIG. 4.

Figure 2A:
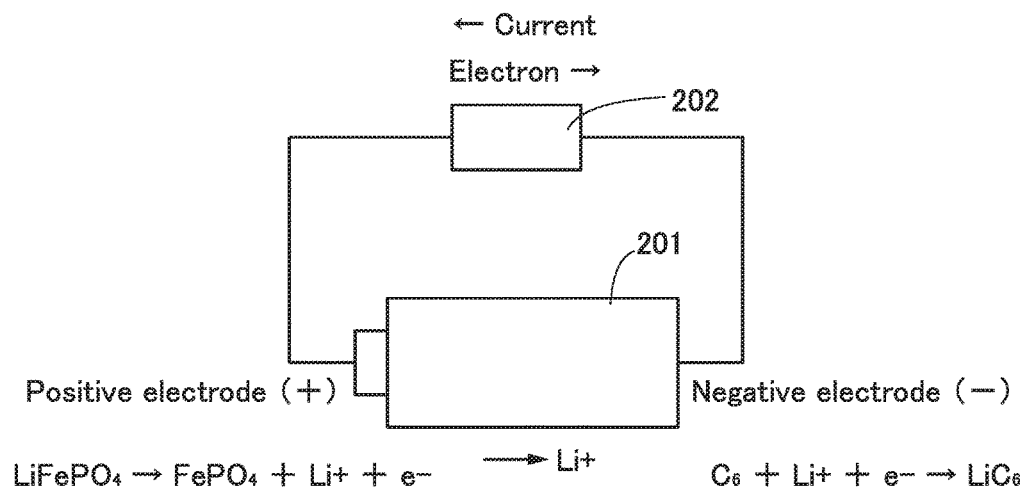
FIGS. 2A and 2B are conceptual diagrams showing the state where a lithium-ion secondary battery is charged.
Figure 2B:
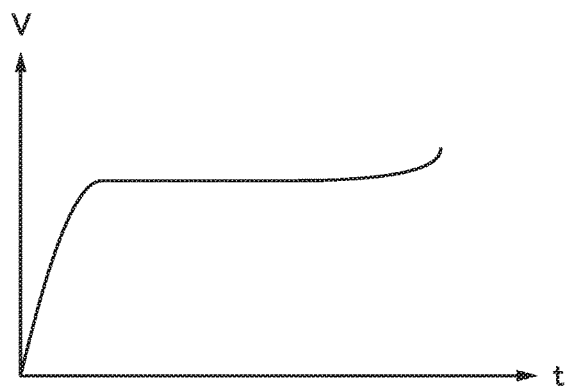
Figure 3A:
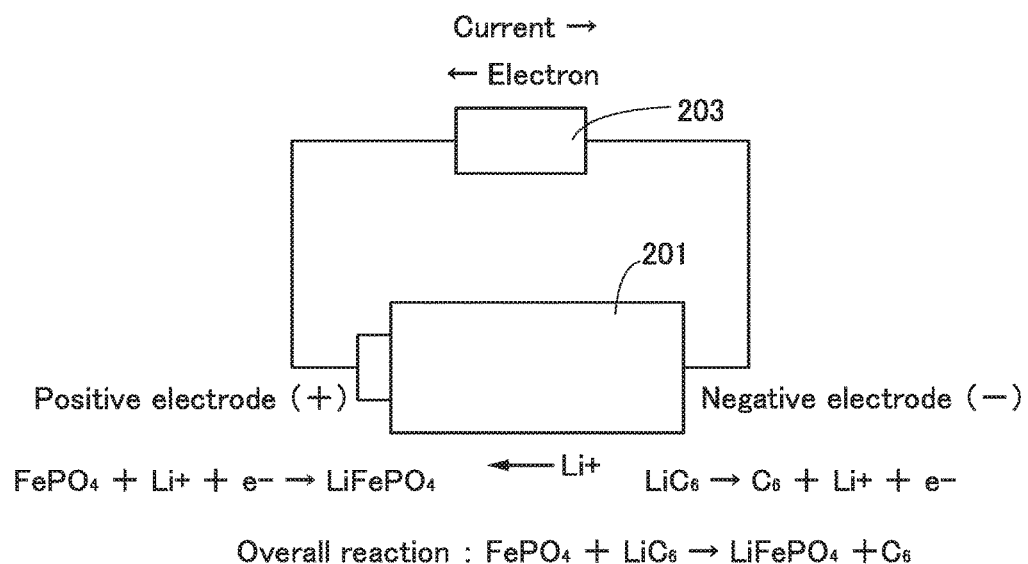
FIGS. 3A and 3B are conceptual diagrams showing the state where a lithium-ion secondary battery is discharged.
Figure 3B:
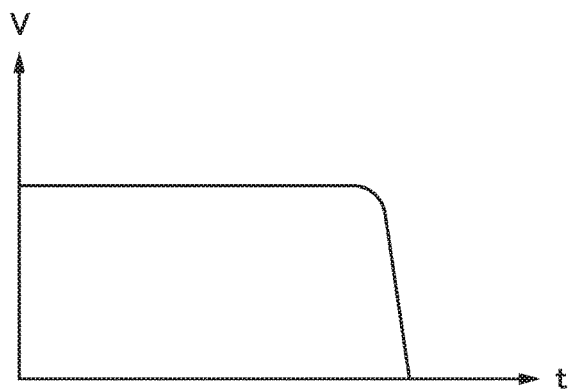

FIGS. 2A and 2B show the case of charging the lithium-ion secondary battery, and FIGS. 3A and 3B show the case of discharging the lithium-ion secondary battery. As illustrated in FIG. 2A and FIG. 3A, when the battery is regarded as a closed circuit, lithium ions transfer and a current flows in the same direction. Further, in the lithium-ion secondary battery, an anode and a cathode change places in charge and discharge, and an oxidation reaction and a reduction reaction occur on the corresponding sides; hence, an electrode with a high redox potential is called a positive electrode and an electrode with a low redox potential is called a negative electrode in this specification. For this reason, in this specification, the positive electrode is referred to as a "positive electrode" and the negative electrode is referred to as a "negative electrode" in all the cases where charge is performed, discharge is performed, an inversion pulse current is supplied, a discharging current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode. In FIGS. 2A and 2B and FIGS. 3A and 3B, a positive electrode includes lithium iron phosphate (LiFePO$_4$) as a positive electrode active material, and a negative electrode includes graphite as a negative electrode active material.

FIG. 2A illustrates a lithium-ion secondary battery 201 and a charger 202 when the lithium-ion secondary battery is charged. In charging the lithium-ion secondary battery, a reaction expressed by Formula (1) occurs in the positive electrode.

$$LiFePO_4 \rightarrow FePO_4 + Li^+ + e^- \tag{1}$$

In addition, a reaction expressed by Formula (2) occurs in the negative electrode.

$$C_6 + Li^+ + e^- \rightarrow LiC_6 \tag{2}$$

Thus, the overall reaction in charging the lithium-ion secondary battery is expressed by Formula (3).

$$LiFePO_4 + C_6 \rightarrow FePO_4 + LiC_6 \tag{3}$$

The battery is supposed to be charged when lithium ions are intercalated into graphite in the negative electrode; however, in the case where a lithium metal is deposited on the negative electrode because of any cause, a reaction expressed by Formula (4) occurs. That is, both a reaction of lithium intercalation into graphite and a lithium deposition reaction occur at the negative electrode.

$$Li^+ + e^- \rightarrow Li \tag{4}$$

The equilibrium potentials of the positive electrode and the negative electrode are determined by a material and an equilibrium state of the material. The potential difference (voltage) between the electrodes varies depending on the equilibrium states of the materials of the positive electrode and the negative electrode.

FIG. 2B shows voltage when the lithium-ion secondary battery is charged. As shown in FIG. 2B, in charging, as a reaction proceeds due to a current that flows over time t, the voltage between the electrodes increases.

FIG. 3A illustrates the lithium-ion secondary battery 201 and a load 203 when the lithium-ion secondary battery is discharged. When the lithium-ion secondary battery is discharged, a reaction expressed by Formula (5) occurs in the positive electrode.

$$FePO_4 + Li^+ + e^- \rightarrow LiFePO_4 \tag{5}$$

In addition, a reaction expressed by Formula (6) occurs in the negative electrode.

$$LiC_6 \rightarrow C_6 + Li^+ + e^- \tag{6}$$

Thus, the overall reaction in discharging the lithium-ion secondary battery is expressed by Formula (7).

$$FePO_4 + LiC_6 \rightarrow LiFePO_4 + C_6 \tag{7}$$

In addition, in discharge performed after the lithium metal is deposited, a reaction expressed by Formula (8) occurs in the negative electrode. That is, both a reaction of lithium deintercalation from graphite and a lithium dissolution reaction occur at the negative electrode.

$$Li \rightarrow Li^+ + e^- \tag{8}$$

FIG. 3B shows voltage when the lithium-ion secondary battery is discharged. As shown in FIG. 3B, in discharging, as a reaction proceeds due to a current that flows over time t, the voltage between the electrodes decreases.

Figure 4:
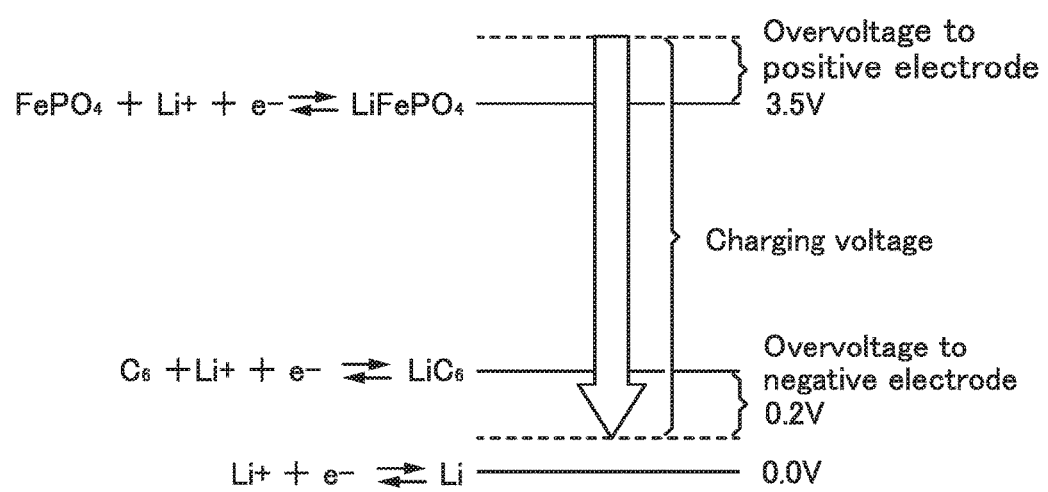
FIG. 4 illustrates the relation between the potentials of a positive electrode and a negative electrode.

FIG. 4 illustrates the relation between the electrode potential of a positive electrode including lithium iron phosphate and the electrode potential of an electrode including a lithium metal, and the relation between the electrode potential of a negative electrode including graphite and the electrode potential of the electrode including a lithium metal. In FIG. 4, the hollow arrow represents a charging voltage.

The potential difference between the positive electrode including lithium iron phosphate and the negative electrode including graphite is as follows: 3.5 V-0.2 V=3.3 V. At a charging voltage of 3.3 V, the reaction of Formula (1) and the reaction of Formula (5) equilibrate in the positive electrode and the reaction of Formula (2) and the reaction of Formula (6) equilibrate in the negative electrode; thus, a current does not flow.

For this reason, a charging voltage higher than 3.3 V needs to be applied so that a charging current is supplied. For example, on the assumption that a series resistance component inside the battery is ignored and all extra charging voltage is used in the electrode reactions of Formulae (1) and (2), as indicated by the hollow arrow in FIG. 4, the extra charging voltage is shared by the positive electrode and the negative electrode as an overvoltage to the positive electrode and an overvoltage to the negative electrode. To obtain a higher current density per unit electrode area, a higher overvoltage is necessary. For example, when the battery is rapidly charged, a current density per unit surface area of an active material needs to be high; thus, a higher overvoltage is needed.

However, as the overvoltage is raised to increase the current density per unit surface area of the active material, the overvoltage to the negative electrode increases; therefore, a potential shown by the tip of the hollow arrow in FIG. 4 becomes lower than the potential of the lithium metal electrode. Then, the reaction of Formula (4) occurs. At this time, lithium is deposited on the surface of the negative electrode. Lithium deposited on the surface of the negative electrode is a product.

Next, a mechanism of reaction product formation on an electrode surface of a battery cell and a mechanism of reaction product dissolution will be described with reference to FIGS. 5A to 5F, FIGS. 6A to 6F, and FIGS. 7A to 7F.

Figure 5A:
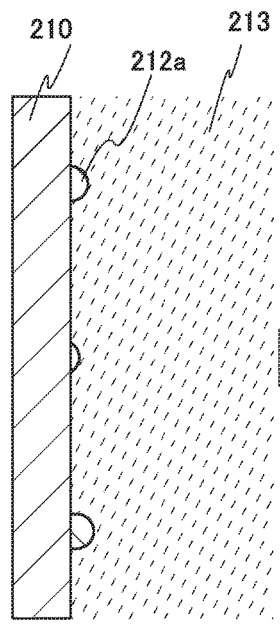
FIGS. 5A to 5F are schematic cross-sectional views illustrating one embodiment of the present invention.
Figure 5B:
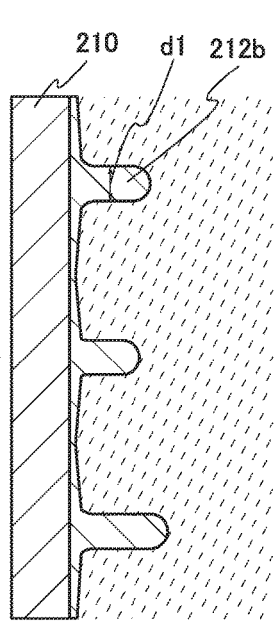
Figure 5C:
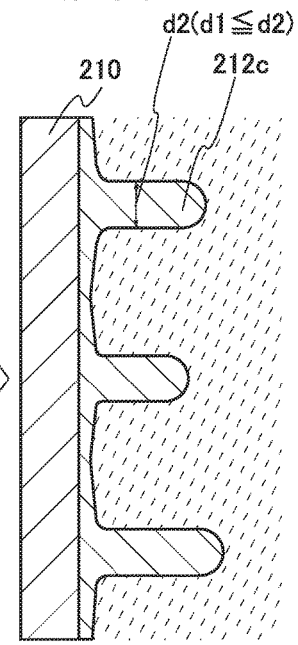

FIGS. 5A to 5C are schematic cross-sectional views sequentially illustrating the states of an electrode 210 of a battery, specifically, the states of reaction products 212a, 212b, and 212c abnormally grown on a surface of a negative electrode.

FIG. 5A is the schematic view of part of the battery including at least a positive electrode, a negative electrode, and an electrolytic solution.

Only the one electrode 210 and an electrolytic solution 213 in the vicinity of the electrode 210 are illustrated in FIGS. 5A to 5C for simplicity.

In FIGS. 5A to 5F, the electrode 210 is either a positive electrode or a negative electrode, and descriptions will be given on the assumption that the electrode 210 is a negative electrode. FIG. 5A illustrates the state where a current is supplied between the negative electrode and a positive electrode (not illustrated) during a period t1 and the reaction products 212a are deposited on the electrode 210 (negative electrode) so that the electrode 210 is dotted with the reaction products 212a.

FIG. 5B illustrates the state where a current is supplied between the negative electrode and the positive electrode during a period t2 (t2 is longer than t1). Projections of the reaction product 212b are abnormally grown from the positions where they are deposited and the reaction product 212b is deposited on the entire surface of the electrode.

FIG. 5C illustrates the state where a current is supplied during a period t3 longer than the period t2. Projections of the reaction product 212c in FIG. 5C are grown to be longer than the projections of the reaction product 212b in FIG. 5B in the direction perpendicular to the electrode surface. Although an example of a reaction product grown to lengthen in the direction perpendicular to the electrode surface is illustrated in FIG. 5B, one embodiment of the present invention is not particularly limited to the example; the reaction product may have a bent portion or a plurality of bent portions while being grown. A thickness d2 of the projection of the reaction product 212c is larger than or equal to a thickness d1 of the projection of the reaction product 212b illustrated in FIG. 5B.

A reaction product is not uniformly deposited on the entire surface of the electrode as a current supply time passes. A reaction product is more likely to be deposited on the position where a reaction product has been deposited than on the other positions, and a larger amount of reaction product is deposited on the position and grown to be a large lump. The region where a large amount of reaction product has been deposited has a higher conductivity than the other region. For this reason, a current is likely to concentrate at the region where the large amount of reaction product has been deposited, and the reaction product is grown around the region faster than in the other region. Accordingly, a projection and a depression are formed by the region where a large amount of reaction product is deposited and the region where a small amount of reaction product is deposited, and the projection and the depression become larger as time goes by as illustrated in FIG. 5C. Finally, the large projection and depression cause severe deterioration of the battery.

Figure 5D:
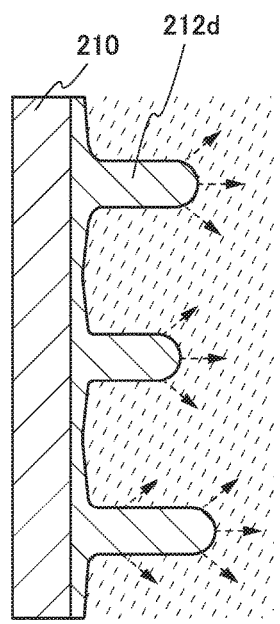

After the state in FIG. 5C, a signal to supply a current in the reverse direction of the current with which a reaction product is formed, an inversion pulse current here, is applied to dissolve the reaction product. FIG. 5D illustrates the state at the time immediately after the inversion pulse current is supplied. As shown by arrows in FIG. 5D, a reaction product 212d is dissolved from its tip or surface. This is because when the inversion pulse current is supplied, the potential gradient around the tip or surface of the reaction product becomes steep, so that the tip or surface of the reaction product is likely to be preferentially dissolved.

The inversion pulse current with which a current flows in the reverse direction of the current with which a reaction product is formed is supplied in the state where the projection and depression due to non-uniform deposition of a reaction product are formed, whereby a current concentrates at the projection and the reaction product is dissolved. The reaction product dissolution means that a reaction product in a region in the electrode surface where a large amount of reaction product is deposited is dissolved to reduce the area of the region where a large amount of reaction product is deposited, preferably means that the electrode surface is restored to the state at the time before a reaction product is deposited on the electrode surface. As well as restoring the electrode surface to the state at the time before a reaction product is deposited on the electrode surface, even inhibiting the growth of a reaction product so that it is kept small or reducing the size of a reaction product can produce a significant effect.

Figure 5E:
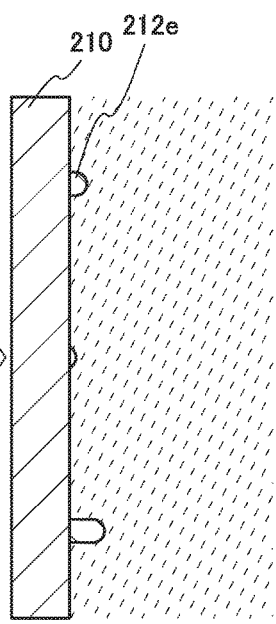

FIG. 5E illustrates a state where the reaction product is being dissolved owing to further flow of the inversion pulse current; the reaction product 212d is dissolved from its tip or surface to be the reaction product 212e smaller than the reaction product 212d.

Figure 5F:
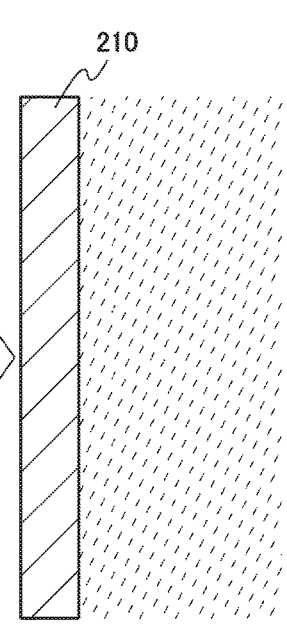

Then, a signal to supply a current in the reverse direction of the current with which a reaction product is formed, e.g., an inversion pulse current, is applied one or more times, so that ideally, the electrode surface can be restored to the state at the time before a reaction product is deposited on the electrode surface as illustrated in FIG. 5F. Since a charging current flows from the right side to the left side in FIGS. 5A to 5F, an inversion pulse current is supplied so as to flow in the direction opposite to the direction of the current flow (from the left side to the right side in FIGS. 5A to 5F). Specifically, one period during which the inversion pulse current is supplied is longer than or equal to 0.1 seconds and shorter than or equal to 3 minutes, typically longer than or equal to 3 seconds and shorter than or equal to 30 seconds.

A technical idea of one embodiment of the present invention is to utilize the mechanism of reaction product formation and the mechanism of reaction product dissolution. One embodiment of the invention disclosed in this specification and the like includes a first electrode and a second electrode, and includes at least an electrolytic solution between the first electrode and the second electrode. A reaction product grown from at least one point in a surface of the first electrode when a current is supplied between the first electrode and the second electrode is dissolved from a tip or a surface of the reaction product by supplying a current in the reverse direction of the current with which a reaction product is formed. The use of the mechanisms can provide a novel battery cell based on an extremely novel principle and a power storage system using the battery cell.

Another embodiment of the present invention is to apply a signal to supply a current in the reverse direction of a current with which a reaction product is formed, more than once. This embodiment of the present invention includes a first electrode and a second electrode, and includes at least an electrolytic solution between the first electrode and the second electrode. A reaction product grown from at least one point in a surface of the first electrode when a current is supplied between the first electrode and the second electrode is dissolved from a tip or a surface of the reaction product by supplying a current in the reverse direction of the current with which a reaction product is formed. Then, supply of a current between the first electrode and the second electrode and supply of a current in the reverse direction of the current with which a reaction product is formed are repeated.

Another embodiment of the present invention is to apply a signal to supply a current in the reverse direction of a current with which a reaction product is formed, for a period shorter than a period during which the reaction product is formed. This embodiment of the present invention includes a first electrode and a second electrode, and includes at least an electrolytic solution between the first electrode and the second electrode. A reaction product grown from at least one point in a surface of the first electrode when a current is supplied between the first electrode and the second electrode for a predetermined period is dissolved from a tip or a surface of the reaction product by supplying a current in the reverse direction of the current with which a reaction product is formed for a period shorter than the predetermined period.

In the case where the reaction product is dissolved into the electrolytic solution at high speed, the state in FIG. 5D can be changed into the state in FIG. 5F even with an extremely short time of application of a signal to supply a current in the reverse direction of the current with which a reaction product is formed.

Depending on the application condition (e.g., pulse width, timing, or intensity) of a signal to supply a current in the reverse direction of the current with which a reaction product is formed, even with only one-time supply of such a signal, the state in FIG. 5D can be changed into the state in FIG. 5F.

Although the negative electrode is taken as an example in FIGS. 5A to 5F, the above description can also apply to the positive electrode to achieve a similar effect.

The progress of the deterioration of a battery can be prevented or the battery can be recovered from its deteriorated state by supplying a signal to supply a current in the reverse direction of a charging current with which a reaction product is formed.

One embodiment of the present invention is not limited to the mechanism illustrated in FIGS. 5A to 5F, and some other mechanisms are also embodiments of the present invention. Hereinafter, variations of mechanisms will be described.

FIGS. 6A to 6F illustrate a mechanism partly different from that in FIGS. 5A to 5F in the process of generation (or the process of growth) of a reaction product; the reaction product is deposited on an entire surface of an electrode and is partly grown abnormally.

Figure 6A:
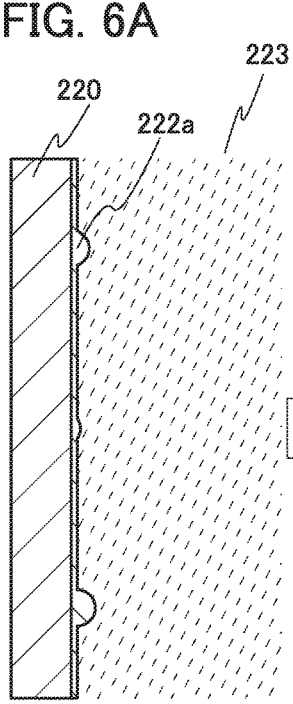
FIGS. 6A to 6F are schematic cross-sectional views illustrating one embodiment of the present invention.
Figure 6B:
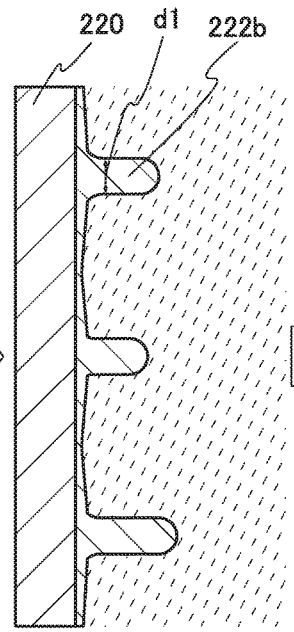
Figure 6C:
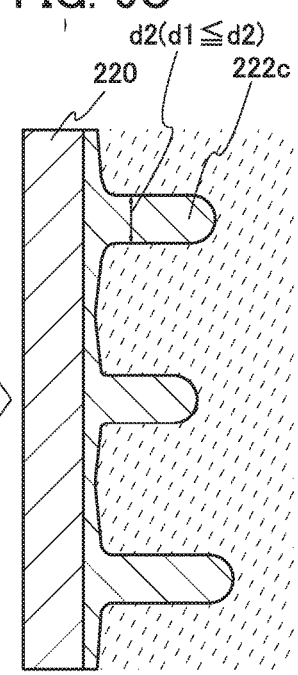

FIGS. 6A to 6C are schematic cross-sectional views sequentially illustrating the states of an electrode 220, specifically, the states of reaction products 222a, 222b, and 222c abnormally grown on a surface of a negative electrode. A space between a pair of electrodes is filled with an electrolytic solution 223.

FIG. 6A illustrates the state where a current is supplied between the negative electrode and a positive electrode (not illustrated) during the period t1, and the reaction products 222a are deposited on the entire surface of the electrode 220 serving as the negative electrode and partly grown abnormally. Examples of a material of the electrode 220 on which the reaction product 222a is deposited are graphite, a combination of graphite and graphene oxide, and titanium oxide.

FIG. 6B illustrates the state of the reaction product 222b grown when a current is supplied between the negative electrode and the positive electrode during the period t2 (t2 is longer than t1). FIG. 6C illustrates the state of the reaction product 222c grown when a current is supplied during the period t3 longer than the period t2.

Figure 6D:
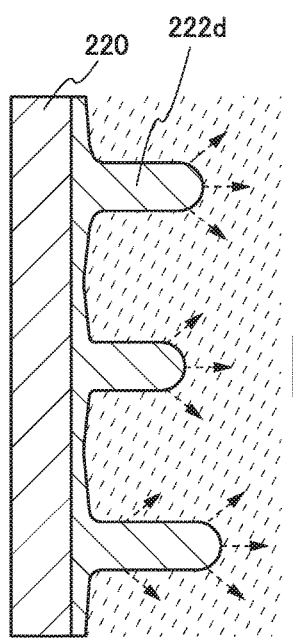

After the state in FIG. 6C, a signal to supply a current in the reverse direction of the current with which a reaction product is formed is applied to dissolve the reaction product. FIG. 6D illustrates the state at the time immediately after a signal to supply a current in the reverse direction of the current with which a reaction product is formed, e.g., an inversion pulse current, is applied. As shown by arrows in FIG. 6D, a reaction product 222d is dissolved from its tip or surface.

Figure 6E:
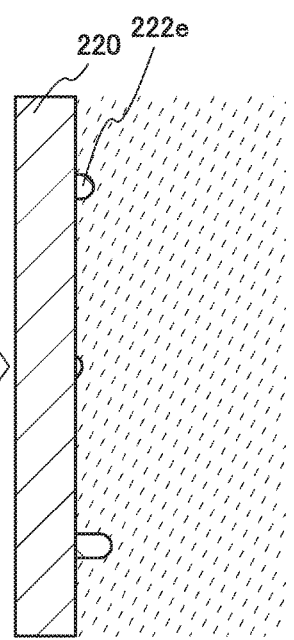

FIG. 6E illustrates a state where the reaction product is being dissolved owing to further flow of the inversion pulse current; the reaction product 222d is dissolved from its tip or surface to be the reaction product 222e smaller than the reaction product 222d.

Figure 6F:
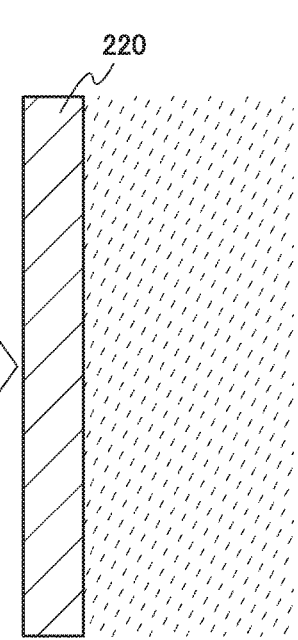

In this manner, one embodiment of the present invention can be applied regardless of the process of generation of the reaction product and the mechanism thereof. A signal to supply a current in the reverse direction of the current with which a reaction product is formed is applied one or more times, whereby, ideally, the electrode surface can be restored to the initial state at the time before the reaction product is deposited on the electrode surface as illustrated in FIG. 6F.

Unlike FIGS. 5A to 5F, FIGS. 7A to 7F are an example where a protective film is formed on an electrode surface and illustrate a state where a reaction product is deposited in a region not covered with the protective film and is abnormally grown.

Figure 7A:
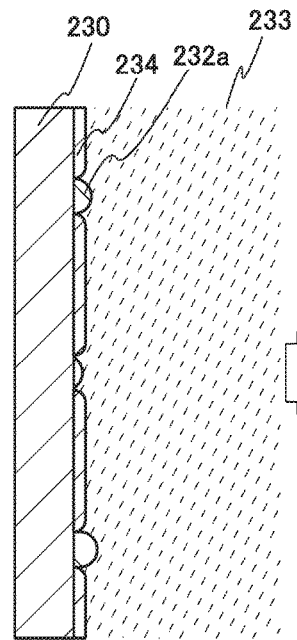
FIGS. 7A to 7F are schematic cross-sectional views illustrating one embodiment of the present invention.
Figure 7B:
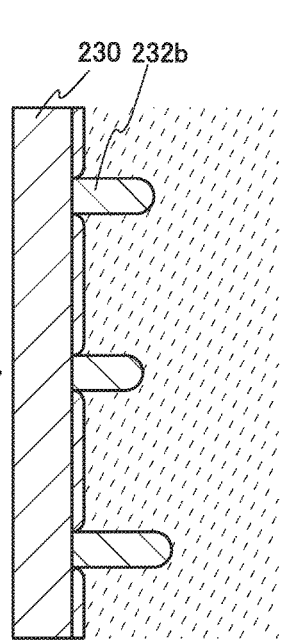
Figure 7C:
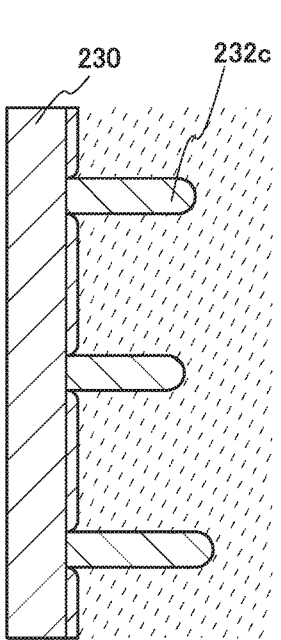

FIGS. 7A to 7C are schematic cross-sectional views sequentially illustrating the states of reaction products 232a, 232b, and 232c abnormally grown and formed in a region of a surface of an electrode 230 (typically, a negative electrode) that is not covered with a protective film 234. A space between a pair of electrodes is filled with an electrolytic solution 233. For the protective film 234, a single layer of a silicon oxide film, a niobium oxide film, or an aluminum oxide film or a stack including any of the films is used.

FIG. 7A illustrates the state where a current is supplied between the negative electrode and a positive electrode (not illustrated) during the period t1, and the reaction products 232a are deposited on exposed portions of the electrode 230 serving as the negative electrode and are grown abnormally.

FIG. 7B illustrates the state of the reaction product 232b grown when a current is supplied between the negative electrode and the positive electrode during the period t2 (t2 is longer than t1). FIG. 7C illustrates the state of the reaction product 232c grown when a current is supplied during the period t3 longer than the period t2.

Figure 7D:
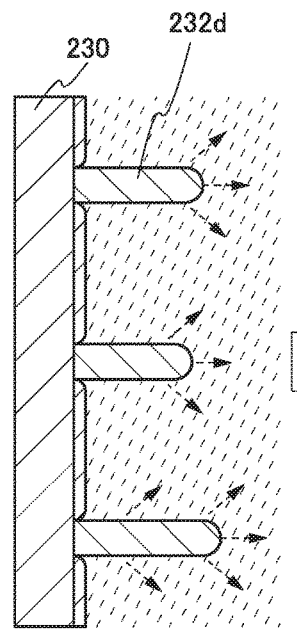

After the state in FIG. 7C, a signal to supply a current in the reverse direction of the current with which a reaction product is formed is applied to dissolve the reaction product. FIG. 7D illustrates the state at the time immediately after a signal to supply a current in the reverse direction of the current with which a reaction product is formed is applied. As shown by arrows in FIG. 7D, a reaction product 232d is dissolved from its tip or surface.

Figure 7E:
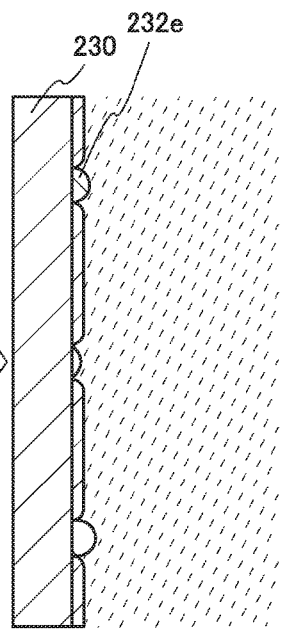

FIG. 7E illustrates the state where the reaction product is in the middle of the dissolution due to further flow of the inversion pulse current; the reaction product 232d is dissolved from its tip or surface to be the reaction product 232e smaller than the reaction product 232d.

Figure 7F:
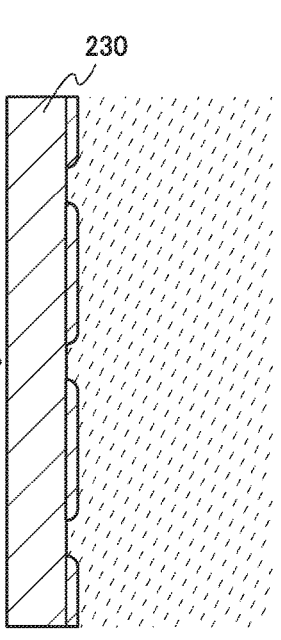

In this manner, a signal to supply a current in the reverse direction of the current with which a reaction product is formed (i.e. a reverse pulse current) is applied one or more times, whereby, ideally, the electrode surface can be restored to the initial state at the time before the reaction product is deposited on the electrode surface as illustrated in FIG. 7F As shown in FIGS. 7A to 7F, one embodiment of the invention disclosed in this specification includes a first electrode, a protective film covering part of the first electrode, a second electrode, and an electrolytic solution between the first electrode and the second electrode. When a current is supplied between the first electrode and the second electrode, a reaction product is grown from a region of a surface of the first electrode that is not covered with the protective film. This reaction product is dissolved by applying a signal to supply a current in the reverse direction of the current with which a reaction product is formed.

As described above, in the state illustrated in FIG. 5C, 6C, or 7C, a deposited reaction product, e.g., lithium or a whisker, can be dissolved by applying an inversion pulse current as a signal with which a current flows in the reverse direction of a charging current; thus, the electrode surface can be restored to a normal state. Further, an inversion pulse current is supplied before the deposited lithium is separated in charging, whereby the lithium is reduced in size or dissolved; thus, separation of the lithium can be prevented.

For example, a lithium metal deposited on a negative electrode of a battery cell causes a variety of defects in the battery cell, which might decrease the reliability of the battery cell. According to one embodiment of the present invention, even when a lithium metal is deposited on a negative electrode, it can be dissolved or made stable by supplying an inversion pulse current while a battery cell is charged; thus, the reliability of the battery cell can be increased. This can increase the capacity ratio of the battery cell, so that the size of the battery cell can be reduced.

The power storage device 101 using such downsized battery cells can be installed indoors; specifically, the power storage device 101 can be placed in the underfloor space 106, as illustrated in FIGS. 1A and 1B. Further, the power storage device 101 using such downsized battery cells can have a longer lifetime; thus, replacement of the power storage device 101 is unnecessary. Further, the size of the power storage device 101 may be increased to a size such that it can be placed in the underfloor space 106.

The use of a plurality of battery cells of one embodiment of the present invention precludes an increase in the volume of the power storage device 101 as large as an increase in that of a conventional one; thus, the power storage device 101 does not need to be provided outdoors and can be placed in the underfloor space 106. When being placed in the underfloor space 106 as described above, the power storage device 101 can be prevented from being exposed to rain or the like, inhibiting deterioration of the power storage device 101 due to moisture. Further, even when the outside air is at a low temperature (e.g., in a minus temperature range), deterioration of the power storage device 101 can be inhibited because the power storage device 101 is provided indoors. This can further increase the lifetime of the power storage device 101.

This embodiment can be freely combined with any of the other embodiments.

Embodiment 3

In this embodiment, a power storage system and a power storage device of one embodiment of the present invention will be described with reference to FIG. 8, FIGS. 9A to 9C, and FIG. 10.

First, a power storage system of one embodiment of the present invention will be described with reference to FIG. 8, and then, a power storage device of one embodiment of the present invention will be described with reference to FIG. 10.

Figure 8:
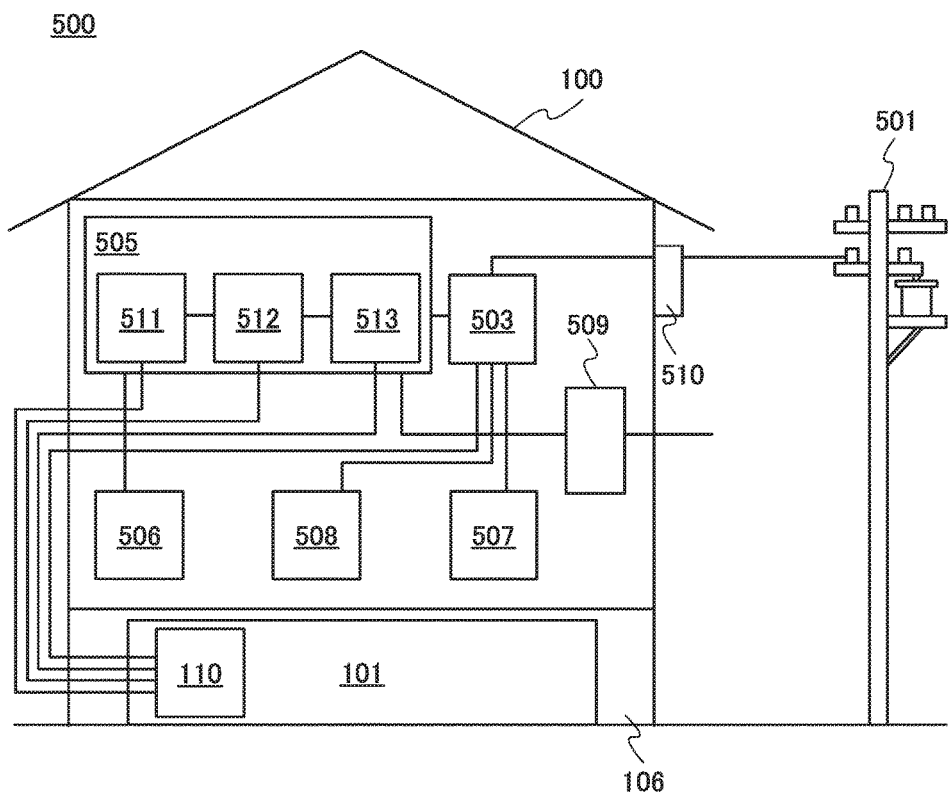
FIG. 8 is a schematic diagram illustrating a power storage system of one embodiment of the present invention.

FIG. 8 illustrates an example of a power storage system 500 of one embodiment of the present invention. As illustrated in FIG. 8, the power storage device 101 of one embodiment of the present invention is provided in the underfloor space 106 of the building 100.

The power storage device 101 is provided with a control device 110, and the control device 110 is electrically connected, via wirings, to a distribution board 503, a power storage controller (also referred to as a control device) 505, an indicator 506, and a router 509.

Power is supplied from a commercial power source 501 to the distribution board 503 through a service wire mounting portion 510. Moreover, power is supplied to the distribution board 503 from the power storage device 101. Power supplied to the distribution board 503 is supplied to a general load 507 and a high power load 508 through an outlet (not illustrated).

The general load 507 is, for example, an electrical device such as a TV or a personal computer. The high power load 508 is, for example, an electrical device such as a microwave, a refrigerator, or an air conditioner.

The power storage controller 505 includes a measuring portion 511, a predicting portion 512, and a planning portion 513. The measuring portion 511 has a function of measuring the amount of power consumed by the general load 507 and the high power load 508 during a day (for example, from midnight to midnight). The measuring portion 511 may also have a function of measuring the amount of power of the power storage device 101 and the amount of power supplied from the commercial power source 501. The predicting portion 512 has a function of predicting the demand for power consumed by the general load 507 and the high power load 508 during a day on the basis of the amount of power consumed by the general load 507 and the high power load 508 during the previous day. The planning portion 513 has a function of making a charge and discharge plan of the power storage device 101 on the basis of the demand for power predicted by the predicting portion 512.

The indicator 506 can show the amount of power consumed by the general load 507 and the high power load 508 that is measured by the measuring portion 511. An electrical device such as a TV or a personal computer can also show it through the router 509. Further, a portable electronic terminal such as a smartphone or a tablet can also show it through the router 509. Moreover, the indicator 506, the electrical device, and the portable electronic terminal can also show, for example, the demand for power depending on a time period (or per hour) that is predicted by the predicting portion 512.

Figure 9A:
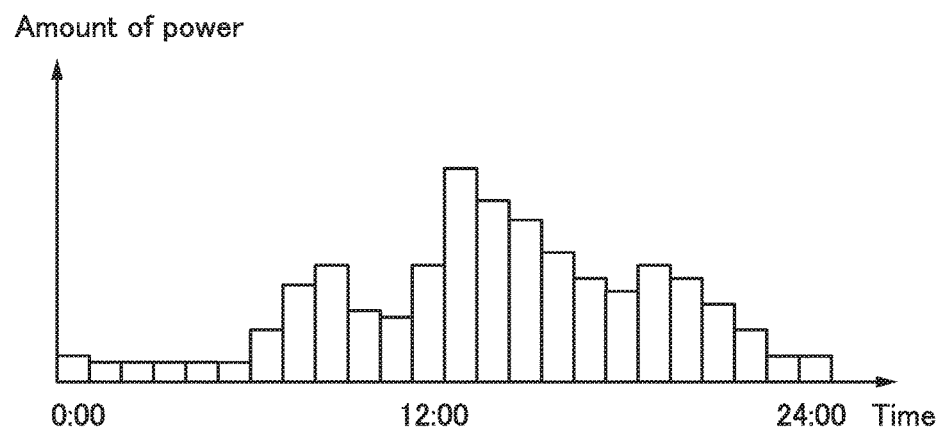
FIG. 9A shows the amount of power consumed by a load.

FIG. 9A shows an example of the amount of power consumed by the general load 507 and the high power load 508 that is measured by the measuring portion 511. In the bar graph shown in FIG. 9A, the horizontal axis represents time, and the vertical axis represents the amount of power consumed by the general load 507 and the high power load 508 that is measured by the measuring portion 511. The amount of power shown in FIG. 9A is the sum of the amount of power supplied from the power storage device 101 and the amount of power supplied from the commercial power source.

Figure 9B:
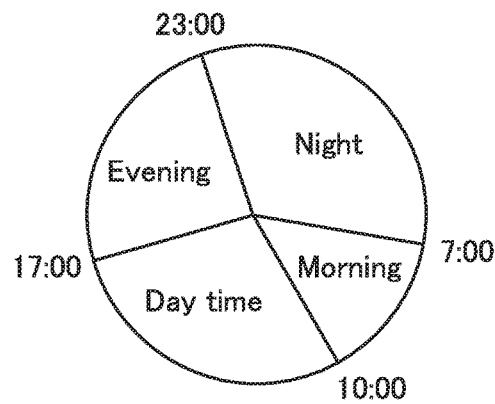
FIGS. 9B and 9C show electric rates depending on time periods.

Some electric power companies adopt a system where the electric rate is high in a time period when the demand for power is high and the electric rate is low in a time period when the demand for power is low. FIG. 9B shows an example of a rate structure of an electric power company. Some electric power companies set different electric rates depending on time periods as shown in a circle graph of FIG. 9B. For example, the electric rate is low in the night time from 11 p.m. to 7 a.m., the electric rate is high in the day time from 10 a.m. to 5 p.m., and the electric rate for the morning time and the evening time is an intermediate rate between the electric rate for the night time and the electric rate for the day time.

Figure 9C:
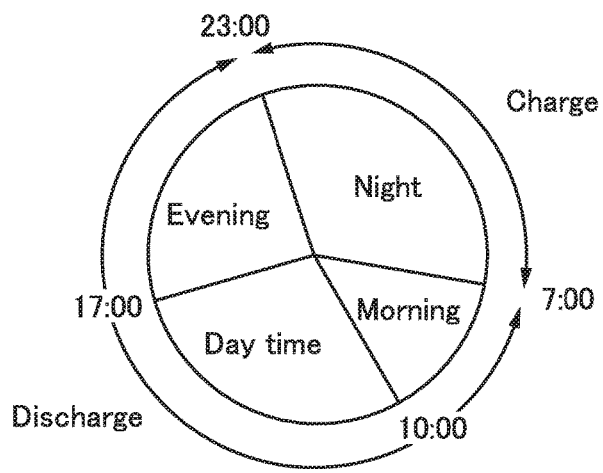

Thus, the power storage system 500 is preferably set by the power storage controller 505 at least so that the power storage device 101 is not charged and is only discharged in the day time when the electric rate is high and it is charged from the commercial power source 501 in the night time when the electric rate is low, as shown in FIG. 9C. That is to say, in the day time, power is supplied to the general load 507 and the high power load 508 from the power storage device 101, while in the night time, power is supplied to the general load 507, the high power load 508, and the power storage device 101 from the commercial power source 501. The power storage device 101 is charged in the night time when power consumption of the general load 507 and the high power load 508 is low, and is discharged in the day time when power consumption of the general load 507 and the high power load 508 is high, whereby the electricity charge can be low and an economic merit can be obtained.

Further, the power storage system 500 can be set by the power storage controller 505 so that depending on the demand for power in, for example, the day time on the next day, charging the power storage device 101 is started in the evening time and is terminated by the end of the night time. Specifically, the power storage system 500 can be set so that the power storage device 101 is charged for 10 hours from 9 p.m. to 7 a.m. Alternatively, the power storage system 500 can be set so that charging the power storage device 101 is started in the night time and is terminated by the end of the morning time. Specifically, the power storage system 500 can be set so that the power storage device 101 is charged for 10 hours from 11 p.m. to 9 a.m. The time for charging the power storage device 101 can be set as appropriate in accordance with the demand for power in the day time.

The power storage controller 505 can select, regardless of a time period, supplying power from the power storage device 101 to the general load 507 and the high power load 508 or supplying power from the commercial power source 501 to the general load 507 and the high power load 508. The power storage controller 505 has a function of supplying power to the general load 507 and the high power load 508 from the power storage device 101 regardless of a time period, when power supply from the commercial power source 501 is stopped or reduced, for example.

FIG. 10 illustrates an example of the power storage device 101 of one embodiment of the present invention. As illustrated in FIG. 10, the power storage device 101 includes at least the control device 110, a DC/DC converter 305, a first battery cell group 301, and a second battery cell group 302. The power storage device 101 further includes a protective circuit 313, a protective circuit 314, a current detector 315, a current detector 316, a switch 303, and a switch 304.

The control device 110 illustrated in FIG. 10 is electrically connected to the power storage controller 505 illustrated in FIG. 8.

The DC/DC converter 305 is preferably a bi-directional DC/DC converter. One terminal of the DC/DC converter 305 is electrically connected to one terminal of the switch 303 and one terminal of the first battery cell group 301. The other terminal of the DC/DC converter 305 is electrically connected to one terminal of the switch 304 and one terminal of the second battery cell group 302. The other terminal of the switch 303 and the other terminal of the switch 304 are electrically connected to one terminal of an AC/DC converter 306. The other terminal of the AC/DC converter 306 is electrically connected to a terminal 321 (a power source or a load).

The battery cell group 301 includes m battery cells (battery cells 311_1 to 311_$m$) ($m$ is a natural number) that are connected in series. The battery cell group 302 includes n battery cells (battery cells 312_1 to 312_$n$) ($n$ is a natural number) that are connected in series. The number of battery cells in the battery cell group 301 is preferably equal to, but may be different from, that of battery cells in the battery cell group 302.

Serially connecting the plurality of battery cells in such a manner can increase the output voltage of the power storage device 101. For example, the output voltage of one lithium-ion secondary battery is approximately 3.2 V. When each of the battery cell group 301 and the battery cell group 302 includes 100 battery cells that are connected in series, for example, the output voltage of the power storage device 101 can be increased to approximately 320 V.

The plurality of battery cells each includes a first electrode and a second electrode, and includes at least an electrolytic solution between the first electrode and the second electrode. One of the first electrode and the second electrode is a positive electrode and the other is a negative electrode.

As illustrated in FIG. 10, the power storage device 101 includes a current detector and a protective circuit that determines and controls the states of all the battery cells. In FIG. 10, the protective circuit 313 is electrically connected to the battery cells 311_1 to 311_$m$, and the protective circuit 314 is electrically connected to the battery cells 312_1 to 312_$n$. Specifically, the protective circuit 313 is electrically connected to the positive electrode and the negative electrode of each of the battery cells 311_1 to 311_$m$. The protective circuit 314 is electrically connected to the positive electrode and the negative electrode of each of the battery cells 312_1 to 312_$n$.

One terminal of the current detector 315 is electrically connected to the other terminal of the first battery cell group 301, and the other terminal of the current detector 315 is grounded. One terminal of the current detector 316 is electrically connected to the other terminal of the second battery cell group 302, and the other terminal of the current detector 316 is grounded.

The control device 110 controls each of the switch 303, the switch 304, the DC/DC converter 305, the AC/DC converter 306, the protective circuit 313, the protective circuit 314, the current detector 315, and the current detector 316. The control device 110 has a function of terminating charging when the voltage of any of the battery cells increases to a predetermined voltage (e.g., 4.35 V for a lithium-ion secondary battery) in charging, for example, by controlling the protective circuit 313, the protective circuit 314, the current detector 315, and the current detector 316. The control device 110 also has a function of terminating discharging when the voltage of any of the battery cells decreases to a predetermined voltage (e.g., 2.3 V for a lithium-ion secondary battery) in discharging. The control device 110 has a function of restricting or terminating charge and discharge when the temperature of any of the plurality of battery cells becomes out of a predetermined temperature range. Thus, the control device 110 controls the protective circuit 313, the protective circuit 314, the current detector 315, and the current detector 316, whereby deterioration of the power storage device 101 can be inhibited, resulting in a higher level of safety.

Next, the case of charging the power storage device of one embodiment of the present invention, the case of supplying an inversion pulse current for a short time during charging of the power storage device, and the case of discharging the power storage device will be described. In this embodiment, an example will be described in which an AC voltage from the terminal 321 is converted into a DC voltage and the battery cell group 301 and the battery cell group 302 are charged with the DC voltage, and then, the DC voltage of the battery cell group 301 and the battery cell group 302 is converted into an AC voltage and the AC voltage is output from the terminal 321.

The power storage device 101 is charged and discharged according to the charge and discharge plan made by the planning portion 513 illustrated in FIG. 8.

<In the Case of Charging Power Storage Device 101>

First, the case of charging the power storage device 101 will be described. In charging the power storage device 101, the switch 303 is turned on and the switch 304 is turned off, an AC current supplied from the terminal 321 is converted into a DC current by the AC/DC converter 306, part of the DC current (e.g., half of the DC current) is supplied to the battery cell group 302 through the switch 303 and the DC/DC converter 305, and the rest of the DC current (e.g., the other half of the DC current) is supplied to the battery cell group 301 through the switch 303. The ratio of a current supplied to the battery cell group 301 to a current supplied to the battery cell group 302 can be controlled as appropriate by the DC/DC converter 305.

Alternatively, the switch 303 and the switch 304 are turned on, an AC current supplied from the terminal 321 is converted into a DC current by the AC/DC converter 306, part of the DC current (e.g., half of the DC current) is supplied to the battery cell group 301 through the switch 303, and the rest of the DC current (e.g., the other half of the DC current) is supplied to the battery cell group 302 through the switch 304. The above manner may be employed to charge the battery cell group 301 and the battery cell group 302.

<In the Case of Supplying Inversion Pulse Current while Charging Power Storage Device 101>

Next, the case of supplying an inversion pulse current to the batter cell group 301 or the battery cell group 302 while the power storage device 101 is charged will be described. The term "supplying an inversion pulse current" in this embodiment mean that a current is made to flow in the reverse direction of a current with which a reaction product is deposited on the first electrode or the second electrode.

For example, in the case of supplying an inversion pulse current to the battery cell group 302, the switch 303 is turned on and the switch 304 is turned off. Thus, an AC current supplied from the terminal 321 is converted into a DC current by the AC/DC converter 306, and the DC current flows to the battery cell group 301. At this time, a current from the battery cell group 302 also flows to the battery cell group 301 through the DC/DC converter 305. As a result, the sum of a current from the AC/DC converter 306 and a current from the battery cell group 302 is supplied to the battery cell group 301. The time for one inversion pulse current supply to the battery cell group 302 is longer than or equal to 0.1 seconds and shorter than or equal to 3 minutes, and is typically longer than or equal to 3 seconds and shorter than or equal to 30 seconds. After the inversion pulse current is supplied to the battery cell group 302, a DC current from the AC/DC converter 306 is supplied to the battery cell group 302.

By thus repeating charging the battery cell group 302 and supplying an inversion pulse current, even if a reaction product is deposited on the first electrode or the second electrode of each battery cell, it can be dissolved. Thus, deterioration of the electrode of each battery cell can be inhibited.

In the case of supplying an inversion pulse current to the battery cell group 301, the switch 303 is turned off and the switch 304 is turned on. Thus, an AC current supplied from the terminal 321 is converted into a DC current by the AC/DC converter 306, and the DC current flows to the battery cell group 302. At this time, a current from the battery cell group 301 also flows to the battery cell group 302 through the DC/DC converter 305. As a result, the sum of a current from the AC/DC converter 306 and a current from the battery cell group 301 is supplied to the battery cell group 302. The time for one inversion pulse current supply to the battery cell group 301 is longer than or equal to 0.1 seconds and shorter than or equal to 3 minutes, and is typically longer than or equal to 3 seconds and shorter than or equal to 30 seconds. After the inversion pulse current is supplied to the battery cell group 301, a DC current from the AC/DC converter 306 is supplied to the battery cell group 301.

By thus repeating charging the battery cell group 301 and supplying an inversion pulse current, even if a reaction product is deposited on the first electrode or the second electrode of each battery cell, it can be dissolved. Thus, deterioration of the electrode of each battery cell can be inhibited.

The battery cell group 301 and the battery cell group 302 are charged according to the charge and discharge plan made by the planning portion 513 in the power storage controller 505 illustrated in FIG. 8.

Even if a reaction product (e.g., lithium metal) is deposited on the first electrode or the second electrode of each battery cell, it can be dissolved by repeatedly supplying an inversion pulse current in a charging period in the above manner. Thus, deterioration of the electrode of each battery cell can be inhibited. Further, the capacity ratio of each battery cell can be increased, so that the size of the battery cell can be reduced.

Thus, the significantly downsized power storage device 101 that uses such downsized battery cells can be installed indoors; specifically, the power storage device 101 can be placed in the underfloor space 106. Further, the power storage device 101 using such downsized battery cells can have a longer lifetime; thus, replacement of the power storage device 101 is unnecessary. Further, the size of the power storage device 101 may be increased to a size such that it can be placed in the underfloor space 106.

<In the Case of Discharging Power Storage Device 101>

Next, the case of discharging the power storage device 101 will be described. In discharging the power storage device 101, the switch 303 is turned on, the switch 304 is turned off, a DC current from the battery cell group 301 is converted into an AC current by the AC/DC converter 306, a DC current from the battery cell group 302 through the DC/DC converter 305 is converted into an AC current by the AC/DC converter 306, and the AC current is supplied to the general load 507 and the high power load 508 through the distribution board 503.

Alternatively, the switch 303 is turned off, the switch 304 is turned on, a DC current from the battery cell group 302 is converted into an AC current by the AC/DC converter 306, a DC current from the battery cell group 301 through the DC/DC converter 305 is converted into an AC current by the AC/DC converter 306, and the AC current is supplied to the general load 507 and the high power load 508 through the distribution board 503.

Even if lithium metal is deposited on the negative electrode of any of the plurality of battery cells, the reaction product is dissolved and the growth of the reaction product is inhibited by supplying an inversion pulse current in a charging period of the battery cells in the above manner; thus, an increase in the resistance of the negative electrode can be inhibited. This can inhibit deterioration of the battery cell, can prevent a reduction in the capacity of the battery cell due to charge or discharge, enables the battery cell or the like to be controlled with low power consumption, can improve the reliability of the battery cell or the like, or leads to a higher level of safety of the battery cell.

Thus, inhibiting deterioration of each battery cell leads to inhibition of deterioration of the power storage device 101, can prevent a reduction in the capacity of the power storage device 101 due to charge or discharge, enables the power storage device 101 to be controlled with low power consumption, can improve the reliability of the power storage device 101 or the like, or leads to a higher level of safety of the power storage device 101.

The use of the power storage device 101 in the power storage system 500 illustrated in FIG. 8 enables planned charge and discharge of the power storage device 101. Thus, the power storage device 101 is charged in the night time when power consumption of the general load 507 and the high power load 508 is low, and is discharged in the day time when power consumption of the general load 507 and the high power load 508 is high, whereby the electricity charge can be low and an economic merit can be obtained.

This embodiment can be freely combined with any of the other embodiments.

Embodiment 4

In this embodiment, the battery cell described in Embodiment 1 and a manufacturing method thereof will be described with reference to FIGS. 11A and 11B, FIGS. 12A and 12B, and FIGS. 13A to 13C.

Figure 11A:
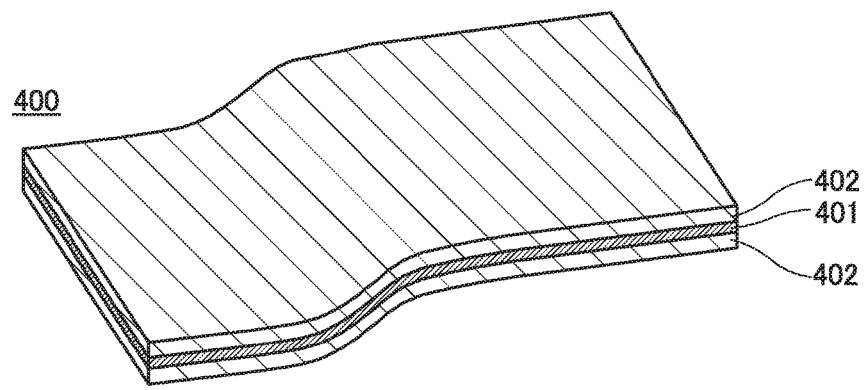
FIGS. 11A and 11B illustrate a positive electrode.

First, a positive electrode of the battery cell will be described with reference to FIGS. 11A and 11B.

A positive electrode 400 includes a positive electrode current collector 401 and a positive electrode active material layer 402 formed over the positive electrode current collector 401 by a coating method, a CVD method, a sputtering method, or the like, for example. Although FIG. 11A illustrates an example of providing the positive electrode active material layers 402 so that the positive electrode current collector 401 with a sheet shape (or a strip-like shape) is sandwiched therebetween, one embodiment of the present invention is not limited to this example. The positive electrode active material layer 402 may be provided over only one of surfaces of the positive electrode current collector 401. Further, although the positive electrode active material layer 402 is provided over the whole positive electrode current collector 401 in FIG. 11A, the positive electrode active material layer 402 may be provided over part of the positive electrode current collector 401. For example, a structure may be employed in which the positive electrode active material layer 402 is not provided in a portion where the positive electrode current collector 401 is connected to a positive electrode tab.

The positive electrode current collector 401 can be formed using a material that has high conductivity and is not alloyed with a carrier ion of lithium or the like, such as a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 401 can have a foil-like shape, a plate-like shape (sheet-like shape), a net-like shape, a punching-metal shape, an expanded-metal shape, or the like as appropriate. The positive electrode current collector 401 preferably has a thickness of greater than or equal to 10 μm and less than or equal to 30 μm.

Figure 11B:
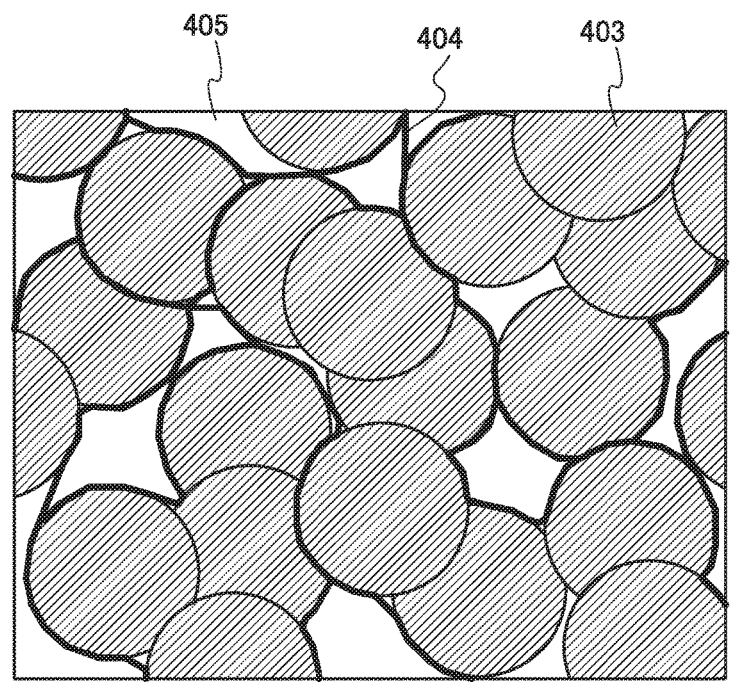

FIG. 11B is a schematic view illustrating a longitudinal cross section of the positive electrode active material layer 402. The positive electrode active material layer 402 includes positive electrode active material particles 403, graphenes 404 as a conductive additive, and a binder 405.

Examples of the conductive additive are acetylene black (AB), ketjen black, graphite (black lead) particles, and carbon nanotubes in addition to graphene described later. Here, the positive electrode active material layer 402 using the graphenes 404 is described as an example.

The positive electrode active material particles 403 are made of secondary particles having an average particle diameter or a particle diameter distribution, which are obtained in such a way that material compounds are mixed at a predetermined ratio and baked and the resulting baked product is crushed, granulated, and classified by an appropriate means. Therefore, the positive electrode active material particles 403 are schematically illustrated as spheres in FIG. 11B; however, the shape of the positive electrode active material particle 403 is not limited to this shape.

For the positive electrode active material particles 403, a material into/from which lithium ions can be inserted and extracted can be used. For example, a material with an olivine crystal structure, a layered rock-salt crystal structure, or a spinel crystal structure can be used.

As an olivine-type compound, a complex oxide represented by $LiMPO_4$ (general formula) (M is one or more of Fe(II), Mn(II), Co(II), and Ni(II)) can be given. Typical examples of $LiMPO_4$ (general formula) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \leq 1$, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

$LiFePO_4$ is particularly preferable because it properly has properties necessary for the positive electrode active material, such as safety, stability, high capacity density, high potential, and the existence of lithium ions which can be extracted in initial oxidation (charge).

Examples of a material with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ ($0<x<1$)) such as $LiNi_{0.8}Co_{0.2}O_2$, NiMn-containing composite oxide (general formula: $LiNi_xMn_{1-x}O_2$ ($0<x<1$)) such as $LiNi_{0.5}Mn_{0.5}O_2$, NiMnCo-containing composite oxide (also referred to as NMC) (general formula: $LiNi_xMn_yCo_{1-x-y}O_2$ ($x>0$, $y>0$, $x+y<1$)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

Examples of a material with a spinel crystal structure are $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to a material with a spinel crystal structure which contains manganese, such as $LiMn_2O_4$, because advantages such as minimization of the elution of manganese and the decomposition of an electrolytic solution can be obtained.

Alternatively, a complex oxide represented by $Li_{(2-j)}MSiO_4$ (general formula) (M is one or more of Fe(II), Mn(II), Co(II), and Ni(II), $0 \leq j \leq 2$) can be used for the positive electrode active material. Typical examples of $Li_{(2-j)}MSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mN_i{}_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a material with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

Other examples of the positive electrode active material that can be used are an active material containing an alkali metal such as sodium or potassium, an active material containing an alkaline-earth metal such as calcium, strontium, barium, beryllium, or magnesium, and an active material containing a rare-earth element. Examples of the rare-earth element are yttrium, scandium, lanthanum, cerium, praseodymium, neodymium, promethium, samarium, europium, gadolinium, terbium, dysprosium, holmium, erbium, thulium, ytterbium, and lutetium.

In the case where carrier ions are alkali metal ions other than lithium ions, or alkaline-earth metal ions, the positive electrode active material particles 403 may be formed using, instead of the above compound or oxide containing lithium, a compound or oxide containing an alkali metal (e.g., sodium or potassium), or an alkaline-earth metal (e.g., calcium, strontium, barium, beryllium, or magnesium).

In the case of using an active material containing sodium for the positive electrode active material particles 403, for example, $NaMn_2O_4$, $NaNiO_2$, $NaCoO_2$, $NaFeO_2$, $NaNi_{0.5}Mn_{0.5}O_2$, $NaCrO_2$, or $NaFeO_2$ can be used. Alternatively, a fluorophosphate such as $Na_2FePO_4F$, $Na_2VPO_4F$, $Na_2MnPO_4F$, $Na_2CoPO_4F$, or $Na_2NiPO_4F$ can be used. Still alternatively, a borate such as $NaFeBO_4$ or $Na_3Fe_2(BO_4)_3$ can be used.

Note that although not illustrated, a carbon layer may be provided on a surface of the positive electrode active material particle 403. A carbon layer provided on a surface of the positive electrode active material particle 403 can increase the conductivity of the electrode. The positive electrode active material particle 403 can be coated with a carbon layer by mixing a carbohydrate such as glucose into the positive electrode active material particle in baking the positive electrode active material particle.

In addition, the graphene 404 that is added as a conductive additive to the positive electrode active material layer 402 can be formed by reducing graphene oxide.

Note that graphene in this specification and the like refers to single-layer graphene or multilayer graphene including two or more and hundred or less layers. Single-layer graphene refers to a one-atom-thick sheet of carbon molecules having π bonds. Graphene oxide refers to a compound formed by oxidizing such graphene. When graphene oxide is reduced to form graphene, oxygen contained in the graphene oxide is not entirely released and part of the oxygen remains in the graphene. When the graphene contains oxygen, the proportion of the oxygen, which is measured by XPS, is higher than or equal to 2 at. % and lower than or equal to 20 at. %, preferably higher than or equal to 3 at. % and lower than or equal to 15 at. %.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the power storage device of one embodiment of the present invention is longer than that in general graphite, carrier ions can easily transfer between the graphenes in multilayer graphene.

Graphene oxide can be formed by an oxidation method called a Hummers method, for example.

The Hummers method is as follows: a sulfuric acid solution of potassium permanganate, a hydrogen peroxide solution, or the like is mixed into graphite powder to cause oxidation reaction; thus, a dispersion containing a graphite oxide is formed. Through the oxidation of carbon of graphite, functional groups such as an epoxy group, a carbonyl group, a carboxyl group, or a hydroxyl group are bonded in the graphite oxide. Accordingly, the interlayer distance between adjacent graphenes of a plurality of graphenes in graphite oxide is longer than the interlayer distance of graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion containing the graphene oxide. The solvent is removed from the dispersion containing the graphene oxide, so that powdery graphene oxide can be obtained.

Note that a method for forming graphene oxide is not limited to the Hummers method using a sulfuric acid solution of potassium permanganate; for example, the Hummers method using nitric acid, potassium chlorate, sodium nitrate, potassium permanganate, or the like or a method for forming graphene oxide other than the Hummers method may be employed as appropriate.

The graphite oxide may be separated into thin pieces by application of ultrasonic vibration, by irradiation with microwaves, radio waves, or thermal plasma, or by application of physical stress.

The formed graphene oxide has an epoxy group, a carbonyl group, a carboxyl group, a hydroxyl group, or the like. In graphene oxide in a polar solvent typified by NMP (also referred to as N-methylpyrrolidone, 1-methyl-2-pyrrolidone, N-methyl-2-pyrrolidone, etc.), oxygen in a functional group is negatively charged; hence, while interacting with NMP, graphene oxides repel each other and do not easily aggregate. Accordingly, graphene oxides in a polar solvent can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

As in the cross-sectional view of the positive electrode active material layer 402 in FIG. 11B, a plurality of the positive electrode active material particles 403 are coated with a plurality of the graphenes 404. One sheet-like graphene 404 is connected to a plurality of the positive electrode active material particles 403. In particular, since the graphene 404 is in the form of a sheet, surface contact can be made in such a way that the surfaces of the positive electrode active material particles 403 are partly wrapped with the graphene 404. Unlike a conductive additive in the form of particles, such as acetylene black, which makes point contact with a positive electrode active material, the graphenes 404 are capable of surface contact with low contact resistance; accordingly, the electron conductivity of the positive electrode active material particles 403 and the graphenes 404 can be improved without an increase in the amount of a conductive additive.

Further, surface contact is made between the plurality of graphenes 404. This is because graphene oxides with exceptional dispersibility in a polar solvent are used for the formation of the graphenes 404. A solvent is removed by volatilization from a dispersion medium including graphene oxides uniformly dispersed and graphene oxides are reduced to give graphenes; hence, the graphenes 404 remaining in the positive electrode active material layer 402 partly overlap with each other and are dispersed such that surface contact is made, thereby forming an electron conduction path.

Some of the graphenes 404 are provided between the positive electrode active material particles 403. Further, the graphene 404 is an extremely thin film (sheet) made of a single layer of carbon molecules or stacked layers thereof and thus is in contact with part of the surfaces of the positive electrode active material particles 403 in such a way as to trace these surfaces. A portion of the graphene 404 which is not in contact with the positive electrode active material particles 403 is warped between the positive electrode active material particles 403 and crimped or stretched.

Consequently, the plurality of graphenes 404 form an electron conduction network in the positive electrode 400. This maintains a path for electric conduction between the positive electrode active material particles 403. Thus, when graphenes whose raw material is graphene oxide and which are formed by reduction performed after a paste is formed are used as a conductive additive, the positive electrode active material layer 402 with high electron conductivity can be formed.

Further, the proportion of the positive electrode active material particles 403 in the positive electrode active material layer 402 can be increased because it is not necessary to increase the additive amount of a conductive additive to increase contact points between the positive electrode active material particles 403 and the graphenes 404. This can increase the discharge capacity of the battery cell.

The average diameter of a primary particle of the positive electrode active material particles 403 is less than or equal to 500 nm, preferably greater than or equal to 50 nm and less than or equal to 500 nm. To make surface contact with a plurality of the positive electrode active material particles 403, the graphenes 404 preferably have sides the length of each of which is greater than or equal to 50 nm and less than or equal to 100 μm, more preferably greater than or equal to 800 nm and less than or equal to 20 μm.

As the binder 405 in the positive electrode active material layer 402, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The above positive electrode active material layer 402 preferably includes the positive electrode active material particles 403 at greater than or equal to 90 wt % and less than or equal to 94 wt %, the graphenes 404 as a conductive additive at greater than or equal to 1 wt % and less than or equal to 5 wt %, and the binder at greater than or equal to 1 wt % and less than or equal to 5 wt % with respect to the total weight of the positive electrode active material layer 402.

Figure 12A:
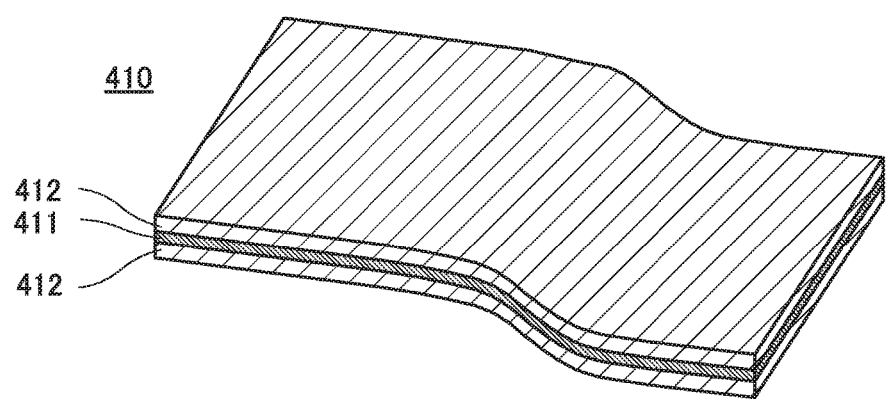
FIGS. 12A and 12B illustrate a negative electrode.

Next, a negative electrode of a battery cell will be described with reference to FIGS. 12A and 12B.

A negative electrode 410 includes a negative electrode current collector 411 and a negative electrode active material layer 412 formed over the negative electrode current collector 411 by a coating method, a CVD method, a sputtering method, or the like, for example. Although FIG. 12A illustrates an example of providing the negative electrode active material layers 412 so that the negative electrode current collector 411 with a sheet shape (or a strip-like shape) is sandwiched therebetween, one embodiment of the present invention is not limited to this example. The negative electrode active material layer 412 may be provided over only one of surfaces of the negative electrode current collector 411. Further, although the negative electrode active material layer 412 is provided over the whole negative electrode current collector 411 in FIG. 12A, the negative electrode active material layer 412 may be provided over part of the negative electrode current collector 411. For example, a structure may be employed in which the negative electrode active material layer 412 is not provided in a portion where the negative electrode current collector 411 is connected to a negative electrode tab.

The negative electrode current collector 411 can be formed using a highly conductive material which is not alloyed with a carrier ion of lithium or the like, such as a metal typified by stainless steel, gold, platinum, zinc, iron, copper, or titanium or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 411 can have a foil-like shape, a plate-like shape (sheet-like shape), a net-like shape, a punching-metal shape, an expanded-metal shape, or the like as appropriate. The negative electrode current collector 411 preferably has a thickness of 10 μm to 30 μm inclusive.

Figure 12B:
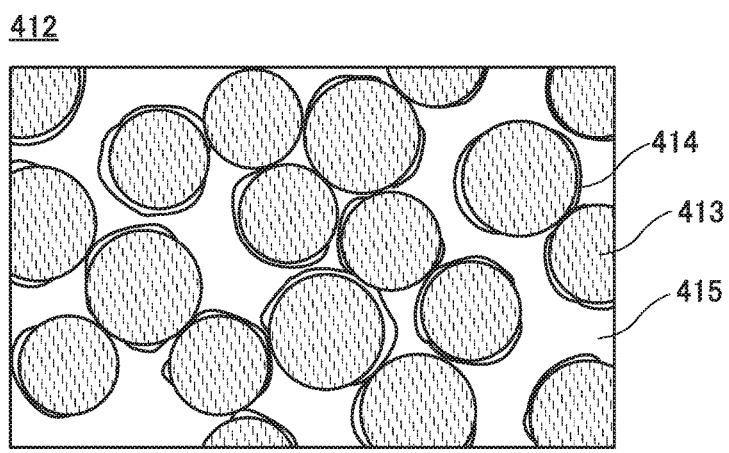

FIG. 12B schematically illustrates part of a cross section of the negative electrode active material layer 412. Although the negative electrode active material layer 412 includes a negative electrode active material 413 and a binder 415 in this embodiment, one embodiment of the present invention is not limited to this; the negative electrode active material layer 412 includes at least the negative electrode active material 413.

A material with which lithium can be dissolved and precipitated or a material into and from which lithium ions can be inserted and extracted can be used for the negative electrode active material 413; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material 413, an alloy-based material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Zn, Cd, In, Ga, and the like can be used for example. Such elements have higher capacity than carbon. In particular, silicon has a significantly high theoretical capacity of 4200 mAh/g. For this reason, silicon is preferably used as the negative electrode active material 413. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material 413, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material 413, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material 413 and thus the negative electrode active material 413 can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material 413; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material particles 403 because of its high potential.

Although the negative electrode active material 413 is illustrated as a particulate substance in FIG. 12B, the shape of the negative electrode active material 413 is not limited thereto. The negative electrode active material 413 can have a given shape such as a plate shape, a rod shape, a cylindrical shape, a powder shape, or a flake shape. Further, the negative electrode active material 413 may have a three-dimensional shape such as unevenness on a surface of a plate shape, fine unevenness on a surface, or a porous shape.

The negative electrode active material layer 412 may be formed by a coating method in the following manner: a conductive additive (not illustrated) or a binding agent is added to the negative electrode active material 413 to form a negative electrode paste; and the negative electrode paste is applied to the negative electrode current collector 411 and dried.

The negative electrode active material layer 412 may be predoped with lithium in such a manner that, for example, a lithium layer is formed on a surface of the negative electrode active material layer 412 by a sputtering method. Alternatively, lithium foil is provided on the surface of the negative electrode active material layer 412, whereby the negative electrode active material layer 412 can be predoped with lithium.

Further, graphene (not illustrated) is preferably formed on the surface of the negative electrode active material 413. For example, in the case of using silicon as the negative electrode active material 413, reception and release of carrier ions in charge and discharge cycles greatly change the volume of silicon. This decreases adhesion between the negative electrode current collector 411 and the negative electrode active material layer 412, resulting in degradation of battery characteristics caused on charge and discharge. In view of this, graphene is preferably formed on the surface of the negative electrode active material 413 containing silicon because this makes it possible to inhibit a decrease in adhesion between the negative electrode current collector 411 and the negative electrode active material layer 412 due to a change in the volume of silicon in charge and discharge cycles, which helps reduce degradation of battery characteristics.

Graphene formed on the surface of the negative electrode active material 413 can be formed by reducing graphene oxide in a manner similar to that of the method for forming the positive electrode. As the graphene oxide, the above-described graphene oxide can be used.

Further, a coating film 414 of an oxide or the like may be formed on the surface of the negative electrode active material 413. A surface film formed by decomposition of an electrolytic solution, or the like in charging cannot release electric charge used in the formation, and therefore forms irreversible capacity. In contrast, the film of an oxide or the like provided on the surface of the negative electrode active material 413 in advance can reduce or prevent generation of irreversible capacity.

As the coating film 414 covering the negative electrode active material 413, an oxide film of any one of niobium, titanium, vanadium, tantalum, tungsten, zirconium, molybdenum, hafnium, chromium, aluminum, and silicon and an oxide film containing lithium and any one of these elements can be used. The coating film 414 formed using such a film is sufficiently dense as compared with a conventional surface film formed on the surface of a negative electrode by a decomposition product of an electrolytic solution.

The product of the electric resistivity and the thickness of the coating film 414 at 25° C. is greater than or equal to 20 Ωm·m, preferably greater than or equal to 200 Ωm·m. When the product of the electric resistivity and the thickness of the coating film 414 at 25° C. is greater than or equal to 20 Ωm·m, the decomposition reaction between the negative electrode active material and an electrolytic solution can be reduced. Further, when the product of the electric resistivity and the thickness of the coating film 414 at 25° C. is greater than or equal to 200 Ωm·m, the decomposition reaction between the negative electrode active material and an electrolytic solution can be inhibited.

A sol-gel method can be employed to form the coating film 414 covering the negative electrode active material 413, for example. The sol-gel method is a method for forming a thin film in such a manner that a solution of metal alkoxide, a metal salt, or the like (also referred to as a treatment liquid) is changed into a gel that has lost its fluidity by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of a metal oxide film, the active material can be easily dispersed into the gel. In such a manner, the coating film 414 can be formed on the surface of the negative electrode active material 413.

Alternatively, the coating film covering the negative electrode active material 413 may be formed in such a manner that a conductive additive and/or a binder is added to the negative electrode active material 413 to form a negative electrode paste, the negative electrode paste is applied to the negative electrode current collector 411 and dried to form a coated electrode, the coated electrode is immersed in a treatment liquid, and then a hydrolysis reaction and a polycondensation reaction occur. This method allows a plurality of negative electrode active material particles to be in contact with each other and permits the coating film to cover part or the whole of the surface except a region where the plurality of negative electrode active material particles are in contact with each other. This can inhibit the reduction decomposition of an electrolytic solution, inhibiting formation of a decomposition product of the electrolytic solution on the negative electrode active material particles due to the reduction decomposition of the electrolytic solution.

The use of the coating film 414 can prevent a decrease in the capacity of a power storage device.

Next, the structure of a battery cell that can be used for a power storage device will be described with reference to FIGS. 13A to 13C.

Figure 13A:
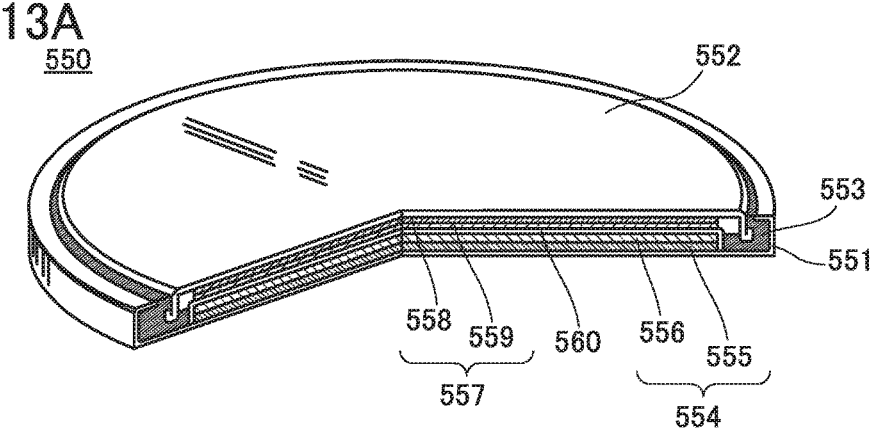
FIGS. 13A to 13C each illustrate a battery cell.

FIG. 13A is an external view of a coin-type (single-layer flat type) lithium-ion battery cell, part of which illustrates a cross-sectional view of part of the coin-type lithium-ion battery cell.

In a coin-type battery cell 550, a positive electrode can 551 doubling as a positive electrode terminal and a negative electrode can 552 doubling as a negative electrode terminal are insulated from each other and sealed by a gasket 553 made of polypropylene or the like. A positive electrode 554 includes a positive electrode current collector 555 and a positive electrode active material layer 556 provided in contact with the positive electrode current collector 555. A negative electrode 557 includes a negative electrode current collector 558 and a negative electrode active material layer 559 provided in contact with the negative electrode current collector 558. A separator 560 and an electrolytic solution (not illustrated) are provided between the positive electrode active material layer 556 and the negative electrode active material layer 559.

The negative electrode 557 includes the negative electrode current collector 558 and the negative electrode active material layer 559. The positive electrode 554 includes the positive electrode current collector 555 and the positive electrode active material layer 556.

For the positive electrode 554, the negative electrode 557, the separator 560, and the electrolytic solution, the above-described members can be used.

For the positive electrode can 551 and the negative electrode can 552, a metal having corrosion resistance to an electrolytic solution, such as nickel, aluminum, or titanium, an alloy of such a metal, or an alloy of such a metal and another metal (e.g., stainless steel or the like) can be used. Alternatively, the positive electrode can 551 and the negative electrode can 552 are preferably covered with nickel, aluminum, or the like in order to prevent corrosion caused by the electrolytic solution. The positive electrode can 551 and the negative electrode can 552 are electrically connected to the positive electrode 554 and the negative electrode 557, respectively.

The negative electrode 557, the positive electrode 554, and the separator 560 are immersed in the electrolytic solution. Then, as illustrated in FIG. 13A, the positive electrode can 551, the positive electrode 554, the separator 560, the negative electrode 557, and the negative electrode can 552 are stacked in this order with the positive electrode can 551 positioned at the bottom, and the positive electrode can 551 and the negative electrode can 552 are subjected to pressure bonding with the gasket 553 interposed therebetween. In such a manner, the coin-type battery cell 550 is fabricated.

It is preferable that, for example, a graphite electrode and lithium iron phosphate ($LiFePO_4$) be used for the negative electrode 557 and the positive electrode 554 of the battery cell 550, respectively. In that case, the safety of the battery cell 550 and the safety of the power storage device 101 in FIGS. 1A and 1B that includes the battery cell 550 can be increased.

Next, an example of a laminated battery cell will be described with reference to FIG. 13B. In FIG. 13B, a structure inside the laminated battery cell is partly exposed for convenience.

Figure 13B:
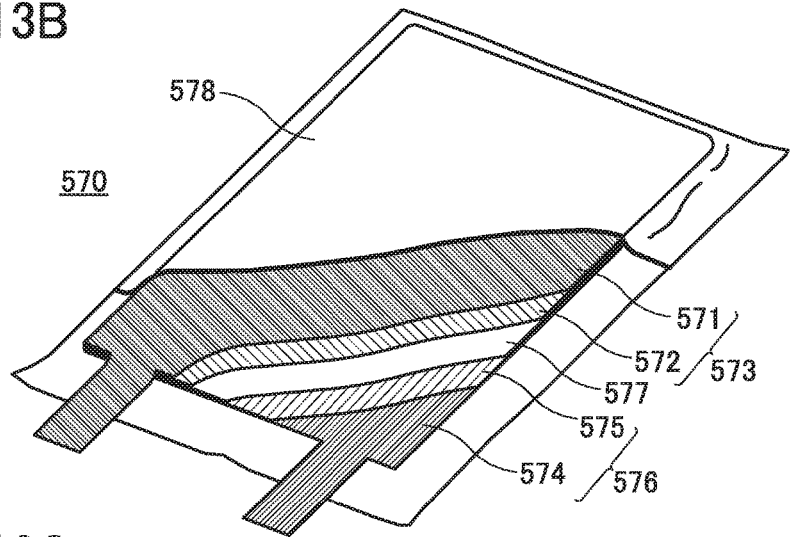

A laminated battery 570 using a laminate film as an exterior body and illustrated in FIG. 13B includes a positive electrode 573 including a positive electrode current collector 571 and a positive electrode active material layer 572, a negative electrode 576 including a negative electrode current collector 574 and a negative electrode active material layer 575, a separator 577, an electrolytic solution (not illustrated), and an exterior body 578. The separator 577 is provided between the positive electrode 573 and the negative electrode 576 in the exterior body 578. The exterior body 578 is filled with the electrolytic solution. Although the one positive electrode 573, the one negative electrode 576, and the one separator 577 are used in FIG. 13B, the battery cell may have a layered structure in which positive electrodes and negative electrodes are alternately stacked and separated by separators.

For the positive electrode 573, the negative electrode 576, the separator 577, and the electrolytic solution (an electrolyte and a solvent), the above-described members can be used.

In the laminated battery 570 illustrated in FIG. 13B, the positive electrode current collector 571 and the negative electrode current collector 574 also serve as terminals (tabs) for an electrical contact with an external portion. For this reason, each of the positive electrode current collector 571 and the negative electrode current collector 574 is arranged so that part of the positive electrode current collector 571 and part of the negative electrode current collector 574 are exposed on the outside the exterior body 578.

As the exterior body 578 in the laminated battery 570, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolytic solution and a gas can be blocked and an insulating property can be obtained.

Next, an example of a rectangular battery cell will be described with reference to FIG. 13C. A wound body 580 illustrated in FIG. 13C includes a negative electrode 581, a positive electrode 582, and a separator 583. The wound body 580 is obtained by winding a sheet of a stack in which the negative electrode 581 overlaps with the positive electrode 582 with the separator 583 provided therebetween. The wound body 580 is covered with a rectangular sealing can or the like; thus, a rectangular battery cell is fabricated. Note that the number of stacks each including the negative electrode 581, the positive electrode 582, and the separator 583 may be determined as appropriate depending on required capacity of the battery cell and the volume of an element.

As in a cylindrical battery cell, in the rectangular battery cell, the negative electrode 581 is connected to a negative electrode tab (not illustrated) through one of a terminal 584 and a terminal 585, and the positive electrode 582 is connected to a positive electrode tab (not illustrated) through the other of the terminal 584 and the terminal 585.

Although the coin-type battery cell, the laminated battery cell, and the rectangular battery cell are described above as examples of the battery cell, battery cells with a variety of shapes can be used. Further, a structure in which a plurality of positive electrodes, a plurality of negative electrodes, and a plurality of separators are stacked or wound may be employed.

Figure 13C:
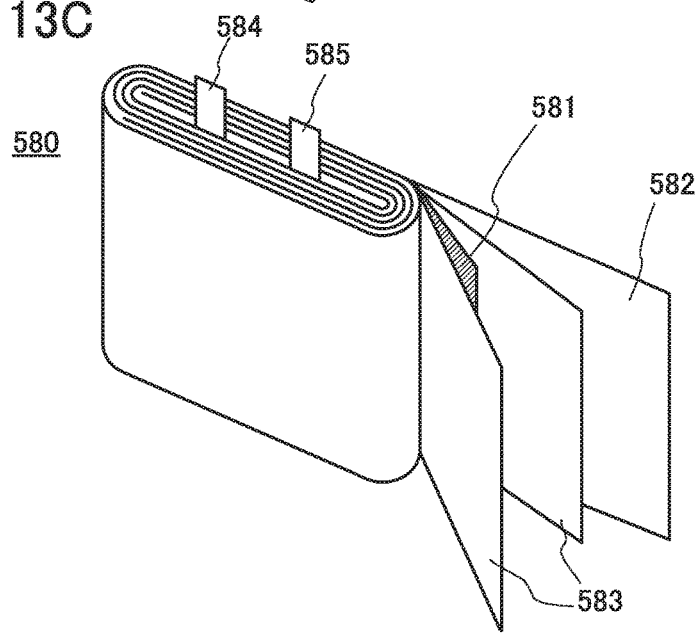

As the separators included in the battery cells illustrated in FIGS. 13A to 13C, a porous insulator such as cellulose (paper), polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

The electrolytic solution used for each of the battery cells illustrated in FIGS. 13A to 13C is preferably a nonaqueous solution (solvent) containing an electrolyte (solute).

As a solvent for the electrolytic solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolytic solution, safety against liquid leakage and the like is improved. Further, a battery cell can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more of ionic liquids (room temperature ionic liquids) that has non-flammability and non-volatility as the solvent for the electrolytic solution can prevent a battery cell from exploding or catching fire even when the battery cell internally shorts out or the internal temperature increases due to overcharging or the like. Thus, the safety of the battery cell can be increased. With the use of the ionic liquid as the solvent for the electrolytic solution, the battery cell can favorably operate even in a low temperature range (minus temperature range) as compared with the case where an organic solvent is used as the solvent for the electrolytic solution.

As an electrolyte dissolved in the above solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Although the case where carrier ions are lithium ions in the above electrolyte is described, carrier ions other than lithium ions can be used. Note that when carrier ions other than lithium ions are alkali metal ions or alkaline-earth metal ions, instead of lithium in the above lithium salts, an alkali metal (e.g., sodium or potassium), an alkaline-earth metal (e.g., calcium, strontium, barium, beryllium, or magnesium) may be used for an electrolyte.

Further, as shown in FIGS. 2A and 3A, ideally, the reactions of lithium insertion and extraction at the negative electrode is equivalent to the reactions of lithium insertion and extraction at the positive electrode. Accordingly, in the case where the capacity per volume of the negative electrode is 1 and that of the positive electrode is 1, the ideal capacity ratio is 100%. However, in practice, the capacity per volume of the negative electrode is generally higher than that of the positive electrode. In FIGS. 13A to 13C, the size of a piece of the graphite is greater than or equal to 9 μm and less than or equal to 30 μm, and a layer of the graphite has a thickness of greater than or equal to 50 μm and less than or equal to 100 μm. The size of a particle of the lithium iron phosphate is greater than or equal to 50 nm and less than or equal to 200 nm, and a layer of the lithium iron phosphate has a thickness of greater than or equal to 60 μm and less than or equal to 110 μm. In addition, as the capacity ratio is closer to 100%, the capacity easily decreases and an abnormal behavior is easily shown.

Supplying an inversion pulse current as a signal with which a current flows in the reverse direction of a charging current can prevent a decrease in capacity and an abnormal behavior even when the capacity ratio is 60% or as high as 85%. This indicates that an abnormal behavior caused by lithium deposition is inhibited. Further, the capacity ratio can be close to 100%, resulting in a great improvement in capacity per cell volume. That is, application of a signal with which a current flows in the reverse direction of a charging current, during charge enables reduction in the size of a battery, in addition to prevention of progress in the battery deterioration or an increase in reliability due to recovery from a deteriorated state. In addition, rapid charge and discharge of the battery can be performed.

When lithium is deposited and thus the length of a whisker is increased, a positive electrode and a negative electrode might be short-circuited; however, the supply of an inversion pulse current during charge can inhibit the lithium deposition and can desirably dissolve a deposit, resulting in an increase in the reliability of a battery. Further, employing a structure of supplying an inversion pulse current during charging allows a structure without a separator provided to prevent a positive electrode and a negative electrode from being short-circuited, which can reduce the cost of materials and shorten the manufacturing process owing to the simplified structure.

The use of a plurality of such battery cells enables fabrication of the power storage device 101 illustrated in FIGS. 1A and 1B. Specifically, battery cells which operate according to the mechanisms described in Embodiment 1 are connected in series. Further, parallely connecting units each including the plurality of battery cells connected in series can increase the capacity of the power storage device 101. Even when having high capacity and large volume, the power storage device 101 can be placed in an underfloor space surrounded by a base and a floor of a building as illustrated in FIGS. 1A and 1B. Since the power storage device 101 can be placed in the underfloor space 106, the power storage device 101 does not need to be provided outdoors. When being placed in the underfloor space 106 as described above, the power storage device 101 can be prevented from being exposed to rain or the like, inhibiting deterioration of the power storage device 101 due to moisture. Further, even when the outside air is at a low temperature (e.g., in a minus temperature range), deterioration of the power storage device 101 can be inhibited because the power storage device 101 is provided indoors. This can further increase the lifetime of the power storage device 101.

This embodiment can be freely combined with any of the other embodiments.

Example 1

In this example, measurement results of the cycle characteristics of a battery cell of one embodiment of the present invention will be described. In this example, battery cells having four different proportions (capacity ratios; 85%, 80%, 60%, and 40%) of volume capacity of a positive electrode to volume capacity of a negative electrode as design conditions of the battery cells were evaluated.

First, structures and fabrication methods of coin-type battery cells used in this example will be described. A battery cell fabricated to have a capacity ratio of 85% is referred to as battery cell A; a battery cell fabricated to have a capacity ratio of 80% is referred to as battery cell B; a battery cell fabricated to have a capacity ratio of 60% is referred to as battery cell C; and a battery cell fabricated to have a capacity ratio of 40% is referred to as battery cell D. Six for each battery cell were fabricated.

Positive electrodes used for battery cells A to D were framed in the following manner. First. NMP was prepared as a dispersion medium, graphene oxide (GO) was dispersed in the NMP at 0.6 wt % as a conductive additive, lithium iron phosphate (which was coated with carbon; also referred to as C/LiFePO$_4$) was added at 91.4 wt % as a positive electrode active material, and then, the mixture was kneaded until it had the consistency of thick paste. After PVDF was added at 8 wt % as a binder to the mixture of the graphene oxide and the lithium iron phosphate, NMP was added as a dispersion medium and mixed, whereby a positive electrode paste was formed.

The positive electrode paste was applied to a positive electrode current collector (20-μm-thick aluminum), dried at 80° C. in an air atmosphere for 40 minutes, and then dried at 170° C. in a reduced atmosphere for 10 hours, whereby the positive electrode in which a positive electrode active material layer was formed over the positive electrode current collector was formed.

Here, the positive electrode used for battery cell A included the positive electrode active material layer with a thickness of 58 μm; the positive electrode used for battery cell B included the positive electrode active material layer with a thickness of 72 μm, the positive electrode used for battery cell C included the positive electrode active material layer with a thickness of 55 μm; and the positive electrode used for battery cell D included the positive electrode active material layer with a thickness of 61 μm.

An electrode sold by TAKUMI GIKEN Co., Ltd. was used as each of negative electrodes of battery cells A to C. Copper foil was used as a negative electrode current collector, mesocarbon microbeads (MCMBs) with a grain diameter of 9 μm were used as a negative electrode active material, conductive graphite was used as a conductive additive, and PVDF was used as a binder. The weight ratio of the negative electrode active material to the conductive additive and the binder in a negative electrode active material layer was 79:14:7.

Here, the negative electrode used for battery cell A included the negative electrode active material layer with a thickness of 65 μm; the negative electrode used for battery cell B included the negative electrode active material layer with a thickness of 86 μm; and the negative electrode used for battery cell C included the negative electrode active material layer with a thickness of 86 μm.

A negative electrode of battery cell D was formed in the following manner. First, silicon ethoxide, ethyl acetoacetate, and toluene were mixed and stirred to form a Si(OEt)$_4$ toluene solution. At this time, the amount of the silicon ethoxide was determined so that the proportion of silicon oxide formed later to graphite (mesocarbon microbeads (MCMBs) each with a diameter of 9 μm) serving as the negative electrode active material was 1 wt %. The compounding ratio of this solution was as follows: the Si(OEt)$_4$ was $3.14 \times 10^{-4}$ mol; the ethyl acetoacetate, $6.28 \times 10^{-4}$ mol; and the toluene, 2 ml.

Next, the Si(OEt)$_4$ toluene solution to which graphite was added was stirred in a dry room. Then, the solution was held at 70° C. in a humid environment for 3 hours so that the Si(OEt)$_4$ in the Si(OEt)$_4$ toluene solution to which the graphite was added was hydrolyzed and condensed. In other words, the Si(OEt)$_4$ in the solution gradually reacted with moisture in the air, so that hydrolysis reaction gradually occurred, and the Si(OEt)$_4$ after the hydrolysis was condensed by dehydration reaction following the hydrolysis reaction. In such a manner, gelled silicon was attached to the surfaces of graphite particles to form a net-like structure of a C—O—Si bond.

Then, baking was performed at 500° C. in a nitrogen atmosphere for three hours, whereby graphite covered with silicon oxide was formed.

The graphite covered with 1 wt % of silicon oxide and PVDF as a binder were mixed to form a negative electrode paste, and the negative electrode paste was applied to a negative electrode current collector and dried, so that a negative electrode active material layer was formed. In this case, the weight ratio of the graphite to the PVDF was 90:10. As a solvent, NMP was used.

Here, the thickness of the negative electrode active material layer of the negative electrode used for battery cell D was 106 μm.

In each of battery cells A to D, an electrolytic solution in which EC and DEC were used as a nonaqueous solvent at a weight ratio of 3:7 and 1 M of $LiPF_6$ was dissolved as an electrolyte was used.

As a separator, a 25-μm-thick porous polypropylene film was used. The separator was impregnated with the above electrolytic solution.

A positive electrode can and a negative electrode can were formed of stainless steel (SUS). As a gasket, a spacer or a washer was used.

Next, the positive electrode can, the positive electrode, the separator, the negative electrode, the gasket, and the negative electrode can were stacked, and the positive electrode can and the negative electrode can were crimped to each other with a "coin cell crimper". Six for each of coin-type battery cells A to D were fabricated.

Table 1 shows design conditions of battery cells A to D. Note that a capacity ratio in Table 1 is a value obtained by dividing single-electrode theoretical capacity of the positive electrode by single-electrode theoretical capacity of the negative electrode. In Table 1, GO represents graphene oxide and AB represents acetylene black. In addition, the term "content" refers to the amount of the active material per unit area of the active material layer.

collector, of each of battery cells A to D. FIG. 14B shows the cell capacity of each of battery cells A to D obtained by calculation. Note that in FIG. 14B, the irreversible capacity was calculated by dividing 10% of the single-electrode theoretical capacity of the negative electrode by the total thickness of the components. Further, the cell capacity was calculated in such a manner that the single-electrode theoretical capacity of the positive electrode was divided by the total thickness of the components and the irreversible capacity was subtracted from the obtained value.

Next, the cycle characteristics of battery cells A to D were measured. In each of battery cells A to D, an inversion pulse current was supplied to three of the six battery cells and was not supplied to the others during charging.

In the case of supplying an inversion pulse current to the battery cell in charging, the charging was performed at a charge rate of 1 C (170 mA/g) and was terminated when the constant current (CC) was 4.0 V. Note that 1 C means the amount of current per unit weight for fully charging a battery cell (each of the evaluation cells, here) in an hour. In this specification, when $LiFePO_4$ is used for the positive electrode of the battery cell and the theoretical capacity of the $LiFePO_4$ is 170 mAh/g, a charging current of 170 mA is 1 C (170 mA/g) assuming that the weight of the $LiFePO_4$ as the positive electrode is 1 g. In this case, an ideal battery is fully charged in an hour. Provided that 1 g of $LiFePO_4$ is a positive electrode, charging at a charging rate of 2 C means that charging is performed by supplying a charging current of 340 mA for 0.5 hours. Further, a signal with which a

TABLE 1

| | Electrode | Active material | Conductive additive | Binder | Thickness [μm] | Electrode density [g/cm$^3$] | Content [mg/cm$^2$] | Single-electrode theoretical capacity [mAh/cm$^2$] | Capacity ratio |
|---|---|---|---|---|---|---|---|---|---|
| Battery cell A | Positive electrode | C/LiFePO$_4$ | GO | PVDF | 58 | 1.71 | 9.4 | 1.6 | 0.84 |
| | Content rate | 91.4 | 0.6 | 8 | | | | | |
| | Negative electrode | Graphite | Conductive graphite | PVDF | 65 | 0.99 | 5.1 | 1.9 | |
| | Content rate | 79 | 14 | 7 | | | | | |
| Battery cell B | Positive electrode | C/LiFePO$_4$ | GO | PVDF | 72 | 1.92 | 12.6 | 2.1 | 0.78 |
| | Content rate | 91.4 | 0.6 | 8 | | | | | |
| | Negative electrode | Graphite | Conductive graphite | PVDF | 86 | 1.08 | 7.4 | 2.8 | |
| | Content rate | 79 | 14 | 7 | | | | | |
| Battery cell C | Positive electrode | C/LiFePO$_4$ | GO | PVDF | 55 | 1.89 | 9.5 | 1.6 | 0.59 |
| | Content rate | 91.4 | 0.6 | 8 | | | | | |
| | Negative electrode | Graphite | Conductive graphite | PVDF | 86 | 1.08 | 7.4 | 2.8 | |
| | Content rate | 79 | 14 | 7 | | | | | |
| Battery cell D | Positive electrode | C/LiFePO$_4$ | GO | PVDF | 61 | 1.68 | 9.4 | 1.6 | 0.37 |
| | Content rate | 91.4 | 0.6 | 8 | | | | | |
| | Negative electrode | Graphite (MCMB 9 μm) with coating | AB | PVDF | 106 | 1.22 | 11.6 | 4.3 | |
| | Content rate | 90 | 0 | 10 | | | | | |

In each of battery cells A to D, the thicknesses of the negative electrode current collector, the positive electrode current collector, and the separator were 18 μm, 20 μm, and 25 μm, respectively.

Figure 14A:
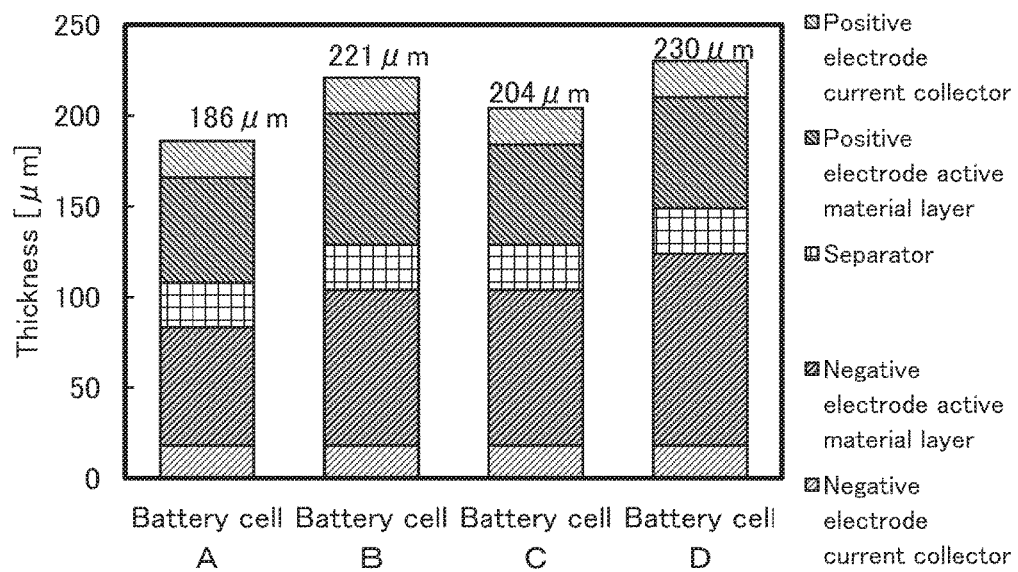
FIG. 14A is a graph showing the thicknesses of components of battery cells.
Figure 14B:
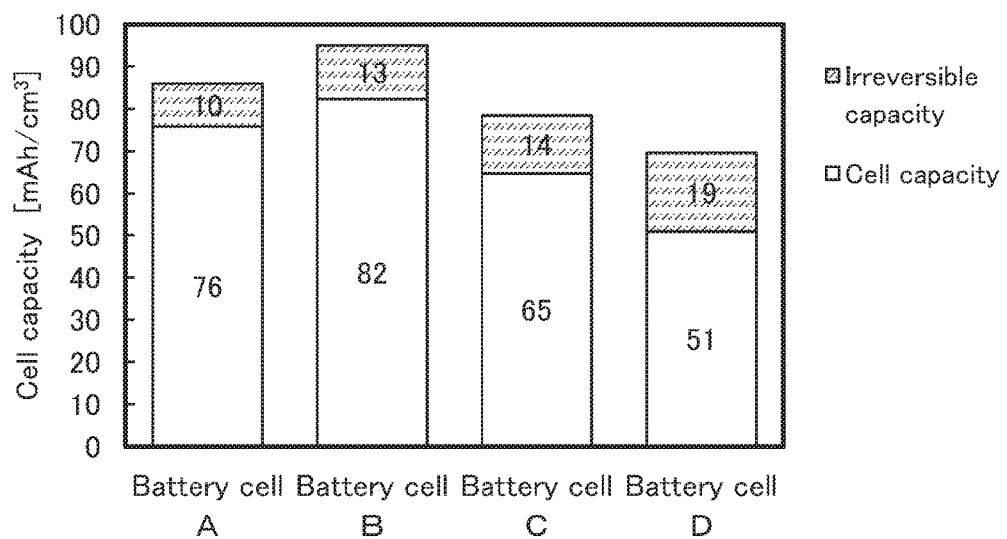
FIG. 14B is a graph showing the cell capacities of the battery cells.

FIG. 14A shows the thicknesses of components, i.e., the negative electrode current collector, the negative electrode active material layer, the separator, the positive electrode active material layer, and the positive electrode current current flows in the reverse direction of a charging current was applied per certain amount of charged power (10 mAh/g). Ten seconds of inversion pulse current supply was repeated during charging with the rate set to 1 C (170 mA/g). Discharging was performed at a discharge rate of 1 C and was terminated when the constant current (CC) was 2.0 V. The charging and the discharging were regarded as one cycle, and the cycle characteristics were measured.

In the case of not supplying an inversion pulse current to the battery cell during charging, the charging was performed at a charge rate of 1 C (170 mA/g) and was terminated when the constant current (CC) was 4.0 V. Discharging was performed at a discharge rate of 1 C and was terminated when the constant current (CC) was 2.0 V. The charging and the discharging were regarded as one cycle, and the cycle characteristics were measured.

Figure 15A:
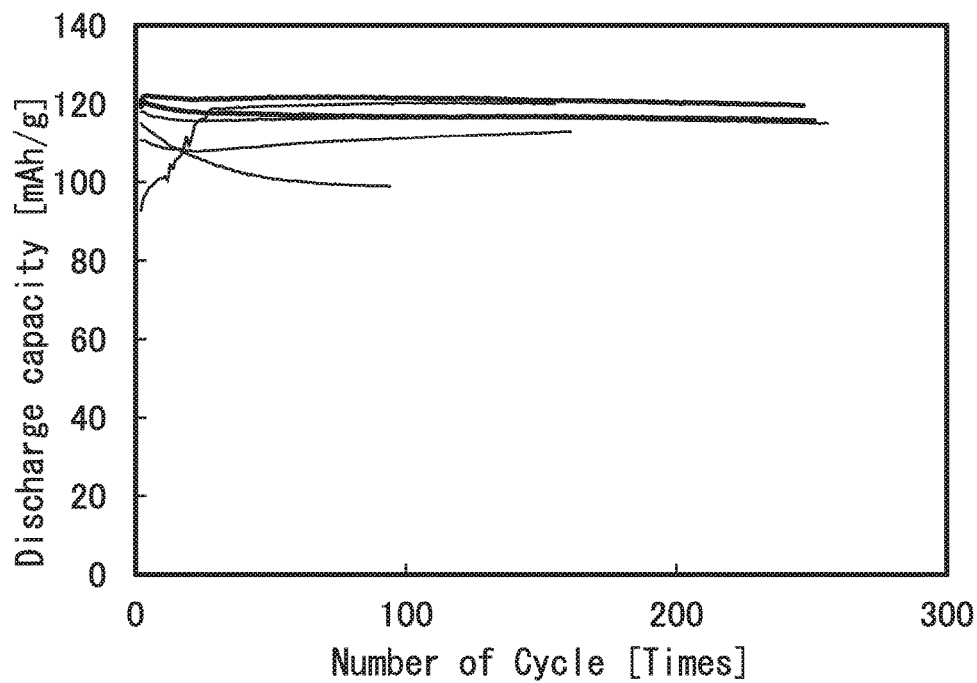
FIGS. 15A and 15B are graphs each showing cycle characteristics.
Figure 15B:
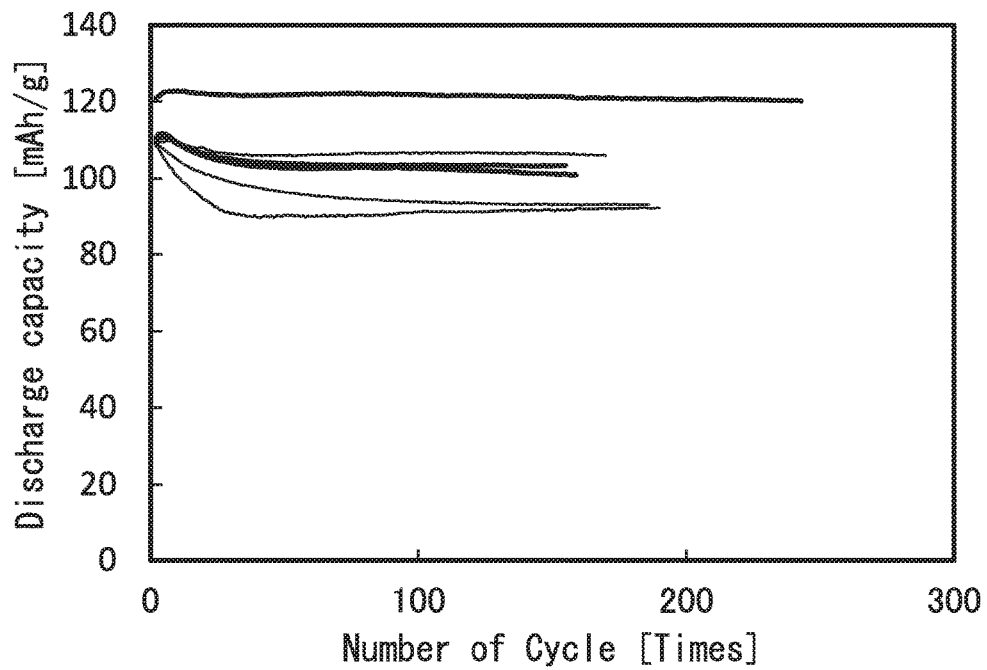
Figure 16A:
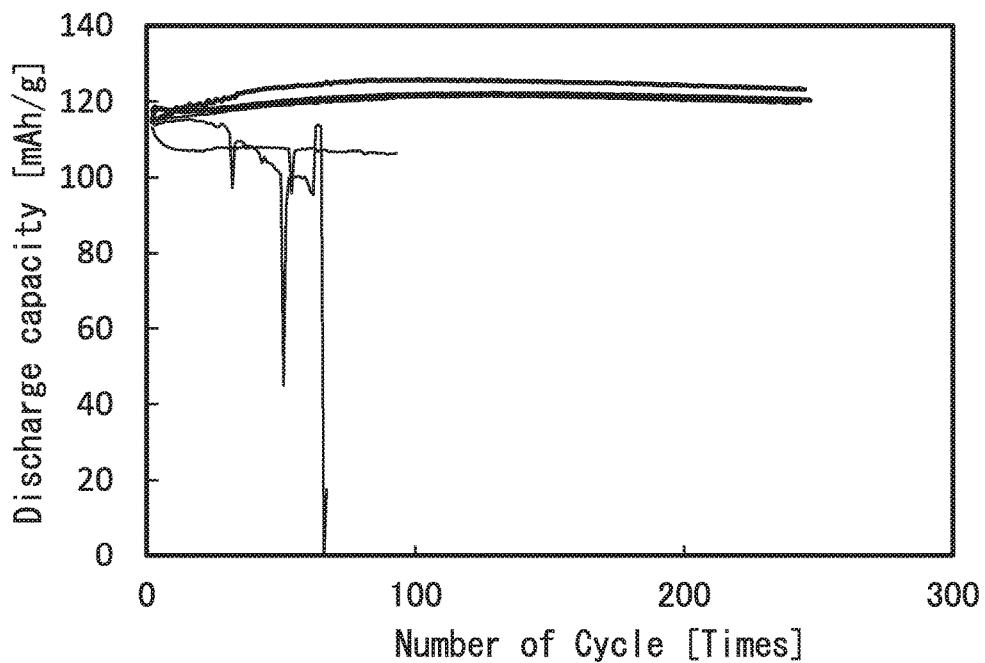
FIGS. 16A and 16B are graphs each showing cycle characteristics.
Figure 16B:
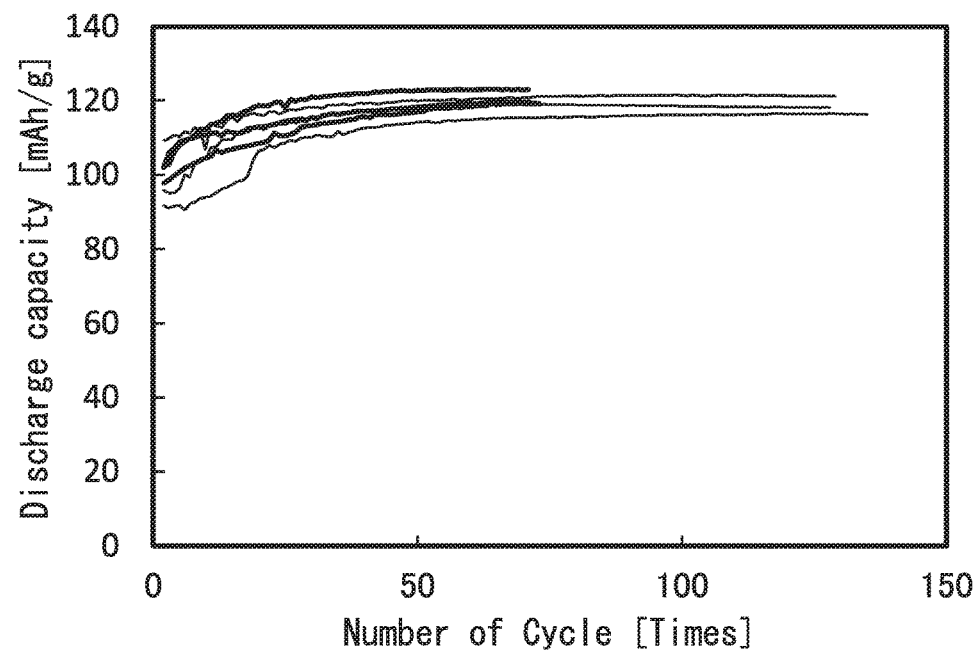

FIGS. 15A and 15B show results of the cycle characteristics of battery cells A and B, respectively, and FIGS. 16A and 16B show results of the cycle characteristics of the battery cells C and D, respectively. In each of FIGS. 15A and 15B and FIGS. 16A and 16B, the horizontal axis represents the number of cycles [times] and the vertical axis represents discharge capacity [mAh/g]. Moreover, in FIGS. 15A and 15B and FIGS. 16A and 16B, bold lines indicate results when an inversion pulse current is supplied to the battery cells during charging and thin lines indicate results when an inversion pulse is not supplied to the battery cells during charging.

As shown in FIGS. 15A and 15B and FIGS. 16A and 16B, in the case of not supplying an inversion pulse current to the battery cells during the charging, battery cell A with a capacity ratio of 85% and battery cell C with a capacity ratio of 60% exhibited abnormal behavior. In contrast, in the case of supplying an inversion pulse current to the battery cells during the charging, stable cycle characteristics are exhibited under all the conditions.

This application is based on Japanese Patent Application serial no. 2013-040595 filed with Japan Patent Office on Mar. 1, 2013, the entire contents of which are hereby incorporated by reference.

What is claimed is:

1. A power storage system comprising:
a control device; and
a power storage device configured to supply power to a load,
wherein the control device includes:
a measuring portion configured to measure an amount of power consumed by the load,
a predicting portion configured to predict the demand for power consumed by the load on the basis of the amount of power consumed by the load, and
a planning portion configured to make a charge and discharge plan of the power storage device on the basis of the demand for power predicted by the predicting portion.

2. The power storage system according to claim 1, wherein the load is a television, a personal computer, a microwave, a refrigerator, or an air conditioner.

3. The power storage system according to claim 1, wherein the predicting portion is configured to predict the demand for power consumed by the load during a day on the basis of the amount of power consumed by the load during the previous day.

4. The power storage system according to claim 1, further comprising an indicator configured to show the amount of power consumed by the load.

5. The power storage system according to claim 1, further comprising a router through which the amount of power consumed by the load is configured to be shown on a smartphone or a tablet.

6. The power storage system according to claim 1, further comprising a power storage controller configured to control the power storage device to be discharged in day time and be charged in night time.

7. A power storage system comprising:
an AC/DC converter;
a control device; and
a power storage device configured to supply power to a load,
wherein the control device includes:
a measuring portion configured to measure an amount of power consumed by the load,
a predicting portion configured to predict the demand for power consumed by the load on the basis of the amount of power consumed by the load, and
a planning portion configured to make a charge and discharge plan of the power storage device on the basis of the demand for power predicted by the predicting portion,
wherein the power storage device comprises:
a DC/DC converter,
a first battery cell group, and
a second battery cell group,
wherein one terminal of the DC/DC converter is electrically connected to one terminal of the AC/DC converter and one terminal of the first battery cell group, and
wherein the other terminal of the DC/DC converter is electrically connected to the one terminal of the AC/DC converter and one terminal of the second battery cell group.

8. The power storage system according to claim 7, wherein the first battery cell group and the second battery cell group each include a plurality of battery cells connected in series in which each battery cell includes a first electrode, a second electrode, and an electrolytic solution between the first electrode and the second electrode.

9. The power storage system according to claim 7, further comprising:
a first switch between the one terminal of the AC/DC converter and the one terminal of the first battery cell group; and
a second switch between the one terminal of the AC/DC converter and the one terminal of the second battery cell group.

10. The power storage system according to claim 7, further comprising:
a first current detector electrically connected to the other terminal of the first battery cell group; and
a second current detector electrically connected to the other terminal of the second battery cell group.

11. The power storage system according to claim 7, wherein the load is a television, a personal computer, a microwave, a refrigerator, or an air conditioner.

12. The power storage system according to claim 7, wherein the predicting portion is configured to predict the demand for power consumed by the load during a day on the basis of the amount of power consumed by the load during the previous day.

13. The power storage system according to claim 7, further comprising an indicator configured to show the amount of power consumed by the load.

14. The power storage system according to claim 7, further comprising a router through which the amount of power consumed by the load is configured to be shown on a smartphone or a tablet.

15. The power storage system according to claim 7, further comprising a power storage controller configured to control the power storage device to be discharged in day time and be charged in night time.

* * * * *